(12) United States Patent
Cokeley

(10) Patent No.: US 11,186,334 B2
(45) Date of Patent: Nov. 30, 2021

(54) OBJECT ADJUSTING APPARATUS AND RELATED METHODS FOR USE WITH AUTOMOTIVE MANUFACTURING SYSTEMS

(71) Applicant: TOYOTA MOTOR ENGINEERING & MANUFACTURING NORTH AMERICA, INC., Plano, TX (US)

(72) Inventor: Anna M. Cokeley, Harrisville, WV (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 213 days.

(21) Appl. No.: 16/509,094

(22) Filed: Jul. 11, 2019

(65) Prior Publication Data

US 2021/0009221 A1 Jan. 14, 2021

(51) Int. Cl.
*B62D 65/18* (2006.01)
*B65G 21/20* (2006.01)
*B62D 65/02* (2006.01)

(52) U.S. Cl.
CPC ........... *B62D 65/18* (2013.01); *B62D 65/022* (2013.01); *B65G 21/2045* (2013.01)

(58) Field of Classification Search
CPC ............... B62D 65/02; Y10T 29/49819; Y10T 29/5196; Y10T 29/53539; Y10T 29/53543; Y10T 29/53548
See application file for complete search history.

(56) References Cited

U.S. PATENT DOCUMENTS

| | | | |
|---|---|---|---|
| 1,772,735 A * | 8/1930 | Romine | B62D 65/18 29/430 |
| 3,977,162 A | 8/1976 | Marchetti | |
| 4,262,469 A * | 4/1981 | Ooms | B65B 7/20 200/300 |
| 4,972,654 A | 11/1990 | Marchetti | |
| 7,484,616 B2 * | 2/2009 | Nakamura | B61B 10/02 104/172.2 |
| 7,607,883 B2 | 10/2009 | Yagi | |

* cited by examiner

*Primary Examiner* — Jason L Vaughan
*Assistant Examiner* — Amanda Kreiling
(74) *Attorney, Agent, or Firm* — Oblon, McClelland, Maier & Neustadt, L.L.P.

(57) ABSTRACT

Object adjusting apparatus and related methods for use with automotive manufacturing systems are disclosed. A disclosed object adjuster for an automotive manufacturing system includes a frame. The object adjuster also includes a guide supported by the frame and positioned near a conveyor configured to convey an object. The object adjuster also includes a receiver slidably coupled to the guide. The receiver includes a portion that is configured to engage an attachment movably coupled to the object to adjust the attachment when the object moves.

18 Claims, 13 Drawing Sheets

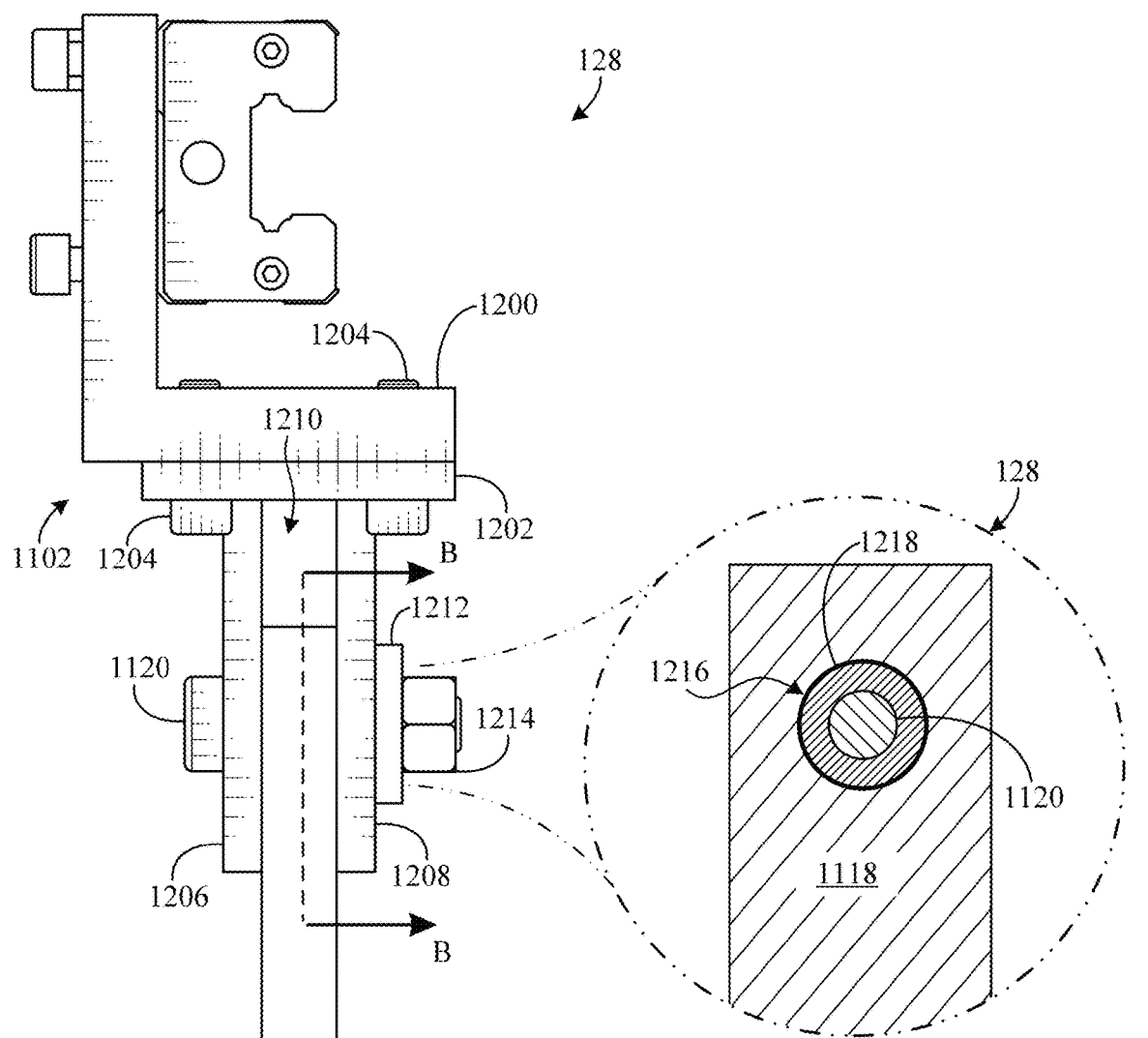
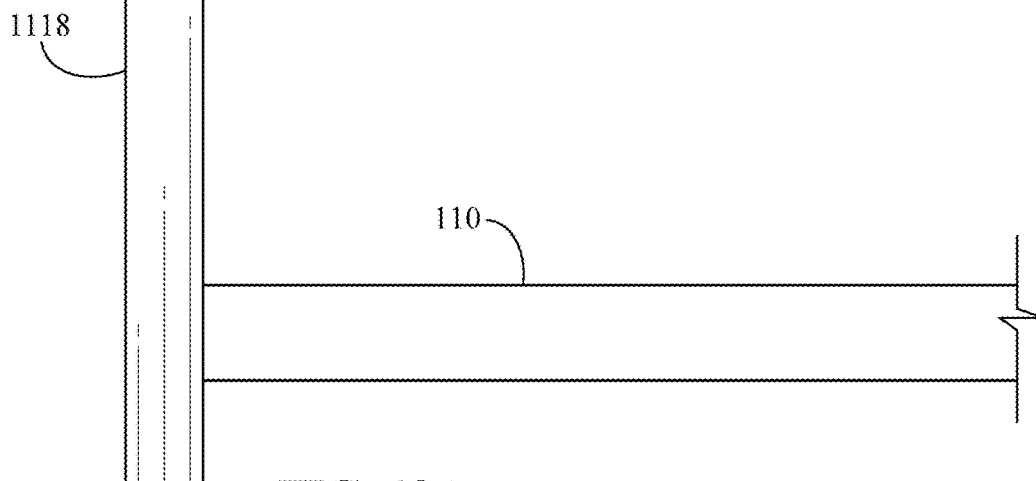
FIG. 12A
FIG. 12B

OBJECT ADJUSTING APPARATUS AND RELATED METHODS FOR USE WITH AUTOMOTIVE MANUFACTURING SYSTEMS

FIELD OF THE DISCLOSURE

This disclosure relates generally to automotive manufacturing systems and, more particularly, to object adjusting apparatus and related methods for use with automotive manufacturing systems.

BACKGROUND

Automotive manufacturing plants typically employ pallets (e.g., engine pallets) that are configured to hold a particular vehicle component (e.g., a portion of an engine) during a production run. Such pallets move along a conveyor to carry the vehicle component to different areas of a manufacturing plant for processing. Before a pallet receives the vehicle component, arms adjustably coupled to the pallet are particularly positioned and/or oriented, which provides sufficient support and/or stability to the vehicle component when the vehicle component is placed on the adjustable arms.

SUMMARY

An example object adjuster for an automotive manufacturing system includes a frame. The object adjuster also includes a guide supported by the frame and positioned adjacent a conveyor configured to convey an object. The object adjuster also includes a receiver slidably coupled to the guide. The receiver includes a portion that is configured to engage an attachment movably coupled to the object to adjust the attachment when the object moves.

An example automotive manufacturing system includes a conveyor configured to receive a pallet. The automotive manufacturing system also includes an object adjuster positioned adjacent the conveyor and including a first portion and a second portion slidable along the first portion. The first portion is configured to guide movement of the second portion relative to a conveyor surface. The second portion and an adjustable portion of the object are configured to move each other when the conveyor conveys the object.

An example method for adjusting an object associated with an automotive manufacturing system includes positioning a receiver of an object adjuster adjacent a conveyor that is configured to move the object. The receiver is slidable along a guide of the object adjuster. The method also includes moving, via the conveyor, the object such that an attachment movably coupled to the object engages a portion of the receiver to adjust the attachment based on movement of the object.

The foregoing paragraphs have been provided by way of general introduction and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 12A is another view of the example adapter of FIG. 11;

FIG. 12B is a partial cross-sectional view of the example adapter of FIG. 12A along line B-B of FIG. 12A.

In general, the same reference numbers will be used throughout the drawing(s) and accompanying written description to refer to the same or like parts.

DETAILED DESCRIPTION

Figure 1:
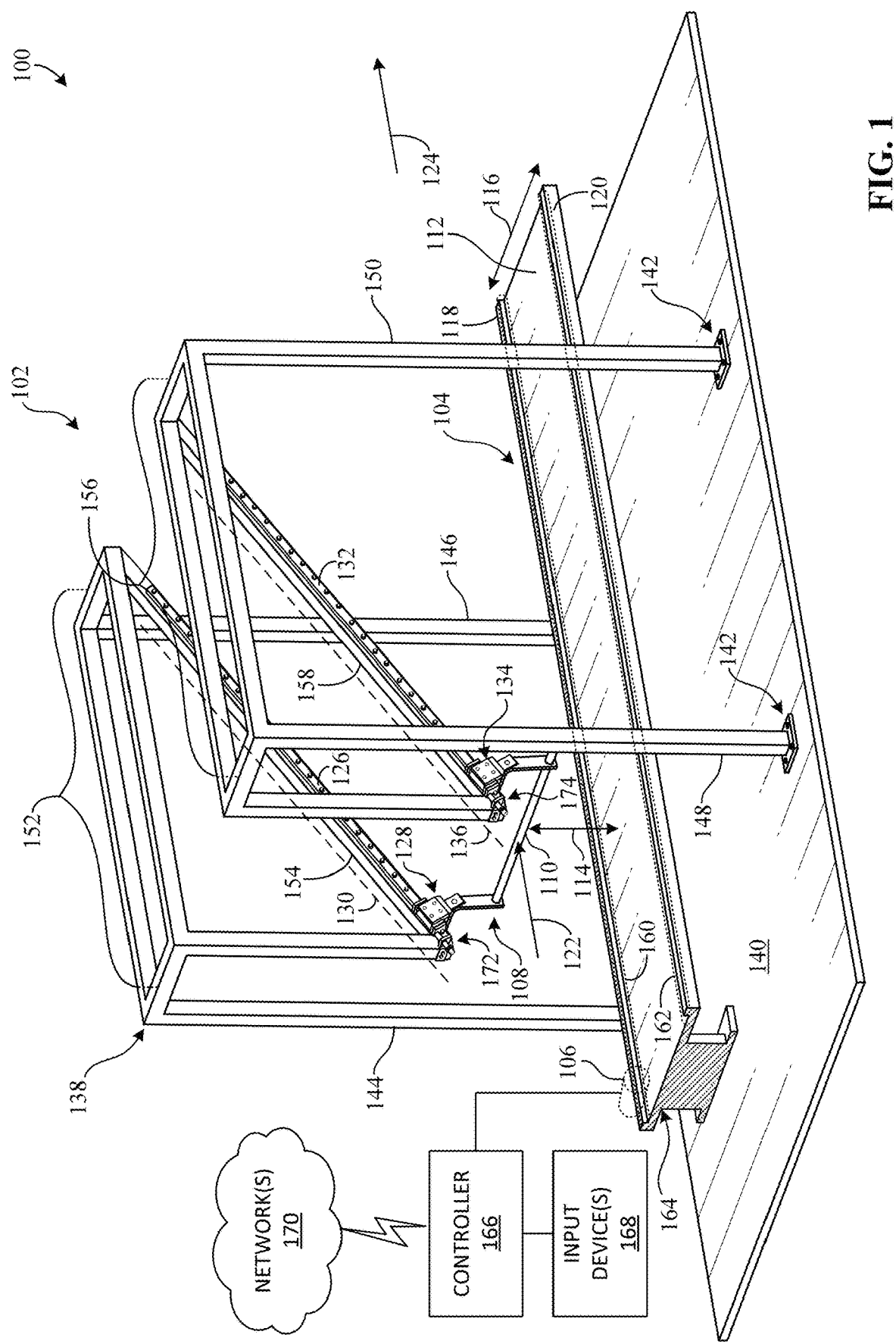
FIG. 1 is a view of an example automotive manufacturing system in which examples disclosed herein can be implemented and shows an example object adjuster in accordance with the teachings of this disclosure.

Some known vehicle manufacturing systems include a known pallet arm raising machine configured to swing a structure relative to a pivot point near a conveyor. In particular, the known pallet arm raising machine also includes a counter weight positioned at one end of the structure to reposition a bar that is disposed at an opposite end of the structure and configured to engage a movable pallet arm as a pallet moves along the conveyor. However, such swinging counter weights (in addition to other related moving components) are relatively heavy, which may pose a risk to nearby users during operation of these known pallet arm raising machines. Additionally, these known pallet arm raising machines may require maintenance and/or plant personnel to be present to ensure the pallet arms are properly adjusted via the swinging bar, which increases downtime and/or operation costs associated with such automotive manufacturing systems.

Object adjusting apparatus and related methods for use with automotive manufacturing systems are disclosed. Examples disclosed herein provide an example object adjuster (e.g., a KaraKuri Kaizen device) for an automotive manufacturing system that is positioned adjacent an example conveyor configured to convey one or more example objects such as, for example, one or more pallets. The disclosed object adjuster is sometimes referred to as a raising machine.

A disclosed object (e.g., an engine pallet) includes one or more attachments (e.g., any of an arm, a cradle, etc.) that are movably coupled thereto and configured to support a workpiece (e.g., a vehicle component such as a portion of an engine) when the attachment(s) are particularly orientated and/or positioned relative to the object. In particular, the disclosed object adjuster is structured and/or configured to adjust the attachment(s) associated with the object via movement of the object relative to the object adjuster, as discussed further below in connection with FIGS. 1-11, 12A, 12B, and 13. In such examples, the object adjuster changes a state of the object in response to the conveyor moving the object across an example area proximate to the object adjuster. When the object enters the area associated with the object adjuster, the object is in a first example state (e.g., an unadjusted state) in which each of the attachments is in a first position (e.g., a lowered position). More particularly, when the object exits the area associated with the object adjuster, the object is in a second example state (e.g., an adjusted state) in which each of the attachment(s) is in a second position (e.g., a raised position) different from the first position.

In some examples, the disclosed object adjuster includes at least an example guide (e.g., a linear guide rail) and an example receiver slidably coupled to the guide, for example, via an example guide block operatively interposed between a rail of the guide and the receiver. The disclosed guide is supported by an example frame of the object adjuster that is positioned on and/or coupled to a ground surface (e.g., a floor of a manufacturing plant). In such examples, the disclosed receiver is configured to slide along the guide in a first direction and/or a second direction opposite the first direction defined by the guide in response to a load imparted on the receiver. In particular, the disclosed guide is sized, shaped, structured, and/or configured to guide movement of the receiver relative to (e.g., toward and/or away from) a surface of the conveyor such that the receiver travels in a direction having a vertical component, which allows for object adjustments.

In some examples, as the conveyor urges the object toward the disclosed object adjuster, an example portion (e.g., a bar) of the disclosed receiver catches and/or otherwise engages the attachment(s). As a result of such engagement, the portion of the receiver and the attachment(s) impart respective forces or loads (e.g., equal and opposite loads) on each other. As the object continues moving along the conveyor through and/or past the object adjuster, the load(s) cause the attachment(s) to pivot and/or otherwise move relative to the object. In particular, the position(s) of the respective attachment(s) change as the load(s) also cause the receiver to slide along the guide away from an example initial position of the receiver toward an end of the guide. That is, movement of the receiver along the guide controls the position(s) of the respective object attachment(s) when the portion of the receiver is connected to the attachment(s). For example, as the receiver slides along (e.g. up) the guide from the initial position toward an example final position (e.g., a predefined position) of the receiver relative to the guide, each of the attachment(s) rotate (e.g., simultaneously) relative to the object from the first position to the second position. Then, when the receiver is sufficiently raised relative to the guide, the portion of the receiver disengages or disconnects from the attachment(s), which allows the object to continue moving along the conveyor to a different area of a manufacturing plant with the attachment(s) properly positioned, oriented, and/or otherwise adjusted. In this manner, disclosed examples adjust the object attachment(s) via a kinetic energy and/or an inertia of the moving object. As a result, examples disclosed herein reduce plant downtime and/or costs that would have otherwise been associated with using external power and/or energy sources (e.g., any of a human source, an electrical source, a pneumatic source, etc.) to change the position(s) of the respective attachment(s).

Additionally, in some examples, the attachment(s) disengage or disconnect from the portion of the receiver when the receiver reaches or passes the final position of the receiver relative to the guide. For example, each of the attachment(s) includes a receptacle (e.g., cradle) that slides against and/or rolls off of the portion of the receiver as the receiver reaches or passes the final position thereof. In such examples, each of the attachment(s) is properly positioned relative to the object when the receiver reaches or passes the final position. In particular, the receiver is configured to slide, via gravity, along (e.g., down) the guide toward a second end, opposite the first end, of the guide when the attachment(s) disengage from the portion of the receiver. That is, a gravitational force imparted on the receiver urges the receiver toward the second end and/or to the initial position. In this manner, disclosed examples reset the receiver using a weight associated with the receiver. As a result, examples disclosed herein further reduce plant downtime and/or costs that would have otherwise been associated with using the external power and/or energy source(s) to change the position or reset the receiver. Thus, the disclosed object adjuster operates using (a) the kinetic energy and/or the inertia of a moving object and/or (b) the weight of the receiver. Additionally, disclosed examples increase plant safety by eliminating hazardous counter weights and/or moving components that would have otherwise been required by the above-mention known pallet arm raising machines.

FIG. 1 is a view of an example automotive manufacturing system (e.g., an assembly line of a manufacturing plant or a portion thereof) 100 in which examples disclosed herein can be implemented and shows an example object adjuster (e.g., a pallet adjuster) 102 in accordance with the teachings of this disclosure. According to the illustrated example of FIG. 1, the automotive manufacturing system 100 includes the object adjuster 102, an example conveyor 104, and one or more example conveyor actuator(s) 106, one of which is shown in this example. In particular, the object adjuster 102 of FIG. 1 is structured and/or configured to adjust one or more objects (e.g., one or more pallets) when the conveyor 104 conveys the object(s), which is discussed in greater detail below in connection with FIGS. 2-11, 12A, 12B, and 13.

The object adjuster 102 of FIG. 1 includes an example receiver 108 operatively coupled thereto, which facilitates carrying out object adjustments. In some examples, to catch one or more movable object attachments during conveyor operation, the receiver 108 defines and/or otherwise includes an example body (e.g., an oblong body such as a bar) 110 that is positioned proximate to a first example surface (e.g., a topmost surface) 112 of the conveyor 104 and/or extends across at least a portion of the first surface 112, for example, such that the body 110 and the first surface 112 form an example clearance 114. As shown in FIG. 1, the body 110 extends across a width 116 defined by a first side 118 of the conveyor 104 and a second side 120 of the conveyor 104 opposite the first side 118. Additionally, the clearance 114 of FIG. 1 is substantially uniform across the width 116. However, in some examples, the body 110 extends across only a portion of the width 116. Further, in some examples, the clearance 114 varies across at least a portion of the width 116. In particular, the receiver 108 is configured to move relative to (e.g., toward and/or away from) the conveyor surface 112, for example, when a first example force or load 122 is imparted on a portion (e.g., the body 110) of the receiver 108 and/or after the first load 122 ceases, which changes (e.g., increases or decreases) the clearance 114. The load of FIG. 1 has at least a component directed in a first direction (e.g., horizontal direction) 124, which enables or drives such movement of the receiver 108.

In some examples, the object adjuster 102 includes a first example guide 126 (e.g., a track or rail) structured and/or configured to guide movement of the receiver 108 relative to the conveyor surface 112. Further, in such examples, the receiver 108 includes a first example adapter 128 slidably coupled to the first guide 126 such that the receiver 108 is slidable at least partially along a length of the first guide 126. As such, in some examples, the receiver 108 is slidably coupled to the first guide 126 via the first adapter 128. In particular, the first guide 126 of FIG. 1 sized, shaped, structured, and/or otherwise configured to form and/or define a first example path 130 along which the first adapter 128 is to travel, as represented by the dotted/dashed lines of FIG. 1. In other words, the first guide 126 defines a first trajectory for the first adapter 128. In such examples, movement of the receiver 108 is based on, for example, a shape of the first guide 126 and/or an orientation of the first guide 126.

Additionally or alternatively, in some examples, the object adjuster 102 includes a second example guide 132 (e.g., a track or rail) structured and/or configured to further guide the movement of the receiver 108 relative to the conveyor surface 112. Further, in such examples, the receiver 108 includes a second example adapter 134 slidably coupled to the second guide 132, similar to the first guide 126 and the first adapter 128. As such, in some examples, the receiver 108 is also slidably coupled to the second guide 132 via the second adapter 134 to connect the first and second guides 128, 132 together. In particular, the second guide 132 of FIG. 1 sized, shaped, structured, and/or otherwise configured to form and/or define a second example path 136 along which the second adapter 134 is to travel, as represented by the dotted/dashed lines of FIG. 1. In other words, the second guide 132 defines a second trajectory associated with the second adapter 134. In such examples, movement of the receiver 108 is based on, for example, a shape of the second guide 132 and/or an orientation of the second guide 132. As such, the first guide 126 of FIG. 1 and/or the second guide 132 of FIG. 1 are configured to guide movement of the receiver 108 relative to the surface 112 of the conveyor 104.

In such examples, the body 110 of the receiver 108 is coupled between the first and second adapters 128, 134 and/or otherwise extends from the first adapter 128 to the second adapter 134, which provides a connection between the first and second adapters 128, 134. As a result, the first and second adapters 128, 134 slide along the respective guides 126, 132 cooperatively or simultaneously in response to body 110 receiving the first load 122.

Although FIG. 1 depicts the object adjuster 102 having the two guides 126, 132 and the two adapters 128, 134, in some examples, the object adjuster 102 is implemented differently. In some such examples, the object adjuster 102 includes only a single guide 126, 132 and a single or respective adapter 128, 134.

In some examples, to provide support to one or more components of the object adjuster 102, the object adjuster 102 includes a first example frame 138 coupled (e.g., removably coupled) to an example mounting surface (e.g., a floor of a manufacturing plant) 140, for example, via one or more example fasteners (e.g., any one or more of screws, bolts, studs, nuts, etc.) 142 and/or one or more example fastening methods or techniques (e.g., welding). In particular, the first frame 138 includes one or more example support structures (e.g., one or more legs) 144, 146, 148, 150 extending away from the mounting surface 140 to receive the component(s), four of which are shown in this example. That is, the first frame 138 of FIG. 1 includes a first example support structure (e.g., a first leg such) 144, a second example support structure (e.g., a second leg) 146, a third example support structure (e.g., a third leg) 148, and fourth example support structure (e.g., a fourth leg) 150.

In some examples, the first frame 138 includes a first example portion 152 associated with supporting the first guide 126, which includes the first support structure 144 and/or the second support structure 146. In particular, the first portion 152 of the first frame 138 includes a fifth example support structure (e.g., a first arm) 154 extending at least partially along the first guide 126 and/or otherwise coupled to the first guide 126 to support the first guide 126, for example, via one or more example fasteners and/or fastening methods or techniques. In some such examples, the first support structure 144 and/or the second support structure 146 are shaped to form the fifth support structure 154 such that the first, second, and fifth support structures 144, 146, 154 form a single-piece or integral component (i.e., form the first portion 152 of the first frame 138). However, in some examples, the first, second, and fifth support structures 144, 146, 154 are produced separately and then coupled together to form the first portion 152.

Additionally or alternatively, in some examples, the first frame 138 includes a second example portion 156 associated with supporting the second guide 132, which includes the third support structure 148 and/or the fourth support structure 150. In particular, the second portion 156 of the first frame 138 includes a sixth example support structure (e.g., a second arm) 158 extending at least partially along the second guide 132 and/or otherwise coupled to the second guide 132 to support the second guide 132, for example, via one or more example fasteners and/or fastening methods or techniques. In some such examples, the third support structure 148 and/or the fourth support structure 150 are shaped to form the sixth support structure 158 such that the third, fourth, and sixth support structures 148, 150, 158 form a single-piece or integral component (i.e., form the second portion 156 of the first frame 138). However, in some examples, the third, fourth, and sixth support structures 148, 150, 158 are produced separately and then coupled together to form the second portion 156.

The conveyor 104 of FIG. 1 can be implemented, for example, using any one or more of a chain conveyor, a floor slat conveyor, a towline conveyor, an overhead conveyor, a roller conveyor, and/or any other appropriate conveyor associated with automotive manufacturing. In some examples, to facilitate moving an object of interest relative to the object adjuster 102, the conveyor 104 includes one or more example conveying devices 160, 162 operatively coupled thereto, two of which are shown in this example (as represented by the dotted/dashed lines of FIG. 1). In other words, the conveyor 104 of FIG. 1 includes a first example conveying device (e.g., a first chain) 160 and a second example conveying device (e.g., a second chain) 162, each of which is configured to carry, pull, and/or otherwise receive a portion of an object of interest. Further, each of the conveying device(s) 160, 162 is moveably coupled to a second example frame 164 of the conveyor 104 such that conveying device(s) 160, 162 are supported by the second frame 164 and moveable (e.g., rotatable) relative thereto, for example, via any one or more of gears, pulleys, rollers, bearings, etc. operatively interposed between the second frame 162 and the respective conveying device(s) 160, 162. In such examples, at least one of the conveying device(s) 160, 162 is operatively coupled to the actuator(s) 106 to receive output generated thereby.

The actuator(s) 106 of FIG. 1 can be implemented, for example, using one or more motors (e.g., electric motor(s)) operatively coupled to the conveying device(s) 160, 162. In particular, based on electrical power supplied to the actuator(s) 106, the actuator(s) 106 are configured to generate a torque or force (i.e., an output) and/or otherwise apply the torque or force to the first conveying device 160 and/or the second conveying device 160, 162 to drive the conveying device(s) 160, 162.

Although FIG. 1 depicts the conveying device(s) 160, 162, in some examples, the conveyor 104 is implemented differently, for example without an electrical power source and/or the actuator(s) 106. In some such examples, the conveyor 104 is implemented using a gravity conveyor (e.g., with actuated stoppers, etc.) that is structured and/or configured to similarly control movement of an object of interest relative to the object adjuster 102.

The second frame 164 of FIG. 1 is coupled to the mounting surface 140, for example, via one or more example fasteners and/or fastening methods or techniques. In some examples, the second frame 164 is adjustably coupled to the mounting surface 140 such that one or more end users (e.g., plant personnel) can change (e.g., increases or decreases) a height of the conveyor surface 112 relative to the mounting surface 140.

In some examples, to facilitate controlling the conveyor 104 and/or collecting data, the automotive manufacturing system 100 also includes an example controller 166 (sometimes referred to as a conveyor controller), one or more example input device(s) 168, and one or more example networks 170. In particular, the controller 166 is configured to control one or more operational parameters (e.g., a speed of the first conveying device 160 and/or the second conveying device 162) associated with the conveyor 104 via the conveyor actuator(s) 106 based on data received from the input device(s) 168 and/or the network(s) 170. In this manner, the controller 166 controls a rate at which a pallet moves in the direction 124 along the conveyor surface 112 toward, through, and/or past the object adjuster 102. Additionally, in some manufacturing applications, a link between the conveyor controller 166 and the network(s) 170 is set up or configured such that example inputs (e.g., data such as barcodes, fault data, etc.) provided to the conveyor controller 166 can be relayed to the network(s) 170. That is, in such examples, the controller 166 is configured to obtain such data and send the data to and/or through the network(s) 170 to communicate with an external database associated with the automotive manufacturing system 100.

The controller 166 of FIG. 1 can be implemented, for example, using a control panel such as a motor or conveyor control panel. The controller 166 is communicatively coupled to the conveyor actuator(s) 106, the input device(s) 168, the network(s) 170, and/or one or more sensors associated with the conveyor 104 to receive data therefrom and/or provide data thereto, for example, via one or more transmission or signal wires, a bus, radio frequency, etc. In some examples, the controller 166 is configured to generate one or more control signals or commands based on such data and provide the control signal(s) or command(s) and/or electrical power to conveyor actuator(s) 106, thereby controlling the operational parameter(s) associated with the conveyor 104.

The input device(s) 168 of FIG. 1 facilitate interactions and/or communications between the controller 166 and/or the end user(s). In some examples, the input device(s) 168 include any one or more of a button, a switch, a lever, a touch screen, a mouse, a keyboard, etc. and/or any other appropriate device communicatively coupled to the controller 166. In such examples, in response to the user(s) interacting with and/or otherwise providing one or more inputs to the input device(s) 168, the input device(s) 168 generate control data (e.g., a request to start or operate the conveyor 104) and/or otherwise provide such user data to the controller 166.

The network(s) 170 of FIG. 1 can be implemented, for example, using any one or more of local area network (LAN), a wide area network (WAN), the Internet, etc. and/or any other appropriate process control system (PCS) network(s). In some examples, the network(s) 170 are communicatively coupled to the controller 166 to provide the control data thereto. Additionally or alternatively, in some examples, the controller 166 provides the inputs and/or other related data associated with the automotive manufacturing system 100 to the network(s) 170.

In some examples (e.g., where the automotive manufacturing system 100 does not include the network(s) 170), the controller 166 can also be implemented using one or more programmable logic controllers. In such examples, one or more example programs are uploaded to and/or installed on the controller 166, which enable the controller 166 to operate the conveyor 104 independent of a network.

Figure 8:
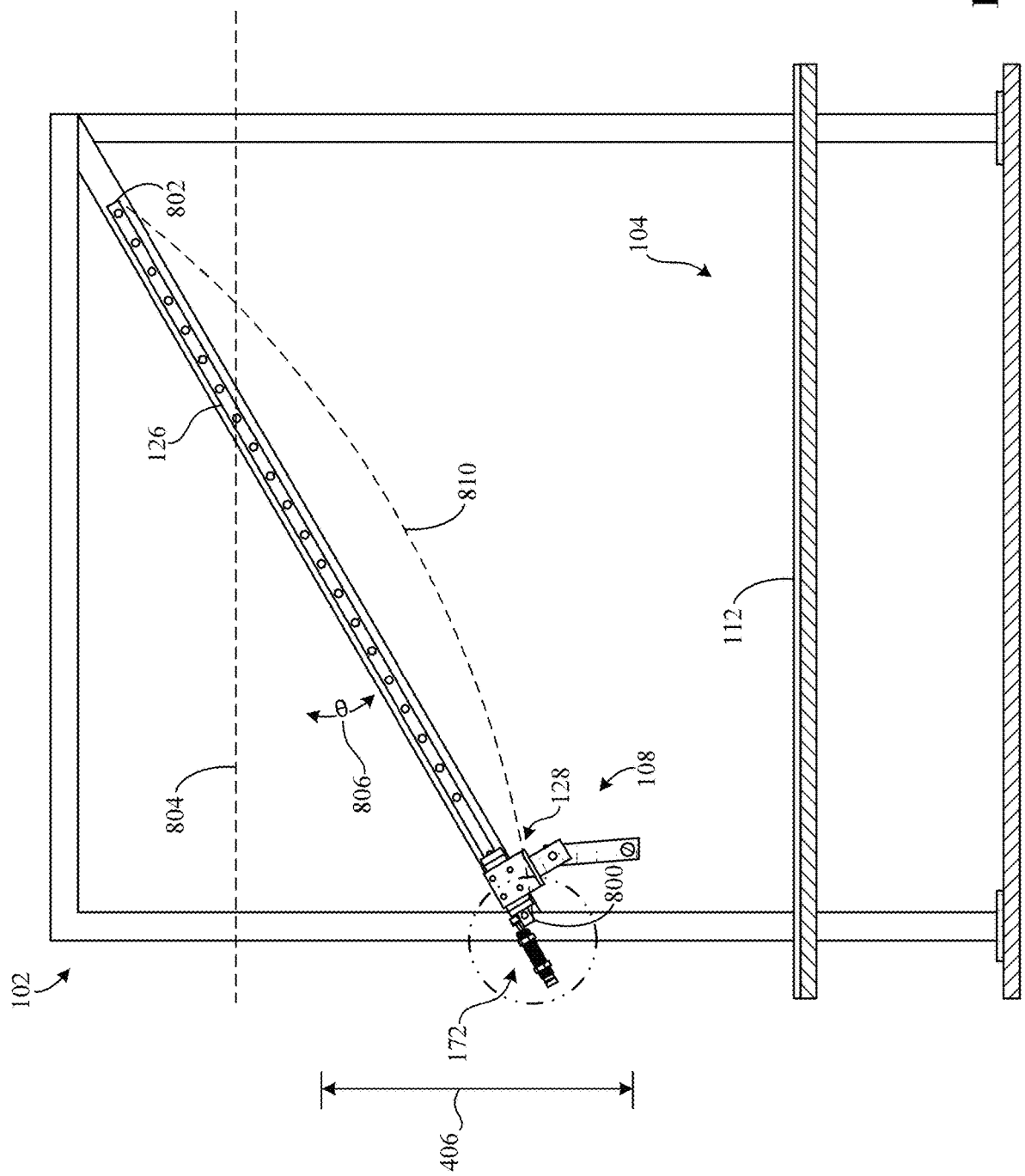
FIG. 8 is a cross-sectional view of the example object adjuster of FIG. 7 along line A-A of FIG. 7 and show an example guide in accordance with the teachings of this disclosure.

In some examples, to decelerate and/or limit movement of the receiver 108, the object adjuster 102 of FIG. 8 includes one or more examples stoppers 172, 174 operatively coupled thereto and positioned near (i.e., adjacent) respective ones of the guide(s) 126, 132, two of which are shown in this example (i.e., a first stopper 172 and a second stopper 174). The first stopper 172 is coupled to the fifth support structure 154 (i.e., a portion of the first frame 138), for example, via the example bracket 902 of FIGS. 9 and 10, which is discussed further below. In particular, in such examples, at least a component (e.g., one of a fluid damper, a spring damper, a fastener, or a combination thereof) of the first stopper 172 is configured to engage at least a portion of the first adapter 128, thereby decelerating (e.g., gradually or rapidly) the first adaptor 128 and/or ceasing movement of the receiver 108. Additionally, in some examples, the second stopper 174 is coupled to the sixth support structure 158, for example, the via the example bracket 902 of FIGS. 9 and 10 or a similar bracket. In particular, in such examples, at least a component (e.g., one of a fluid damper, a spring damper, a fastener, or a combination thereof) of the second stopper 174 is configured to engage at least a portion of the second adapter 134, thereby decelerating (e.g., gradually or rapidly) the second adaptor 134, which provides better positional control of the receiver 108 compared to using a single stopper 172, 174 and/or decreases stopping forces generated thereby.

Figure 2:
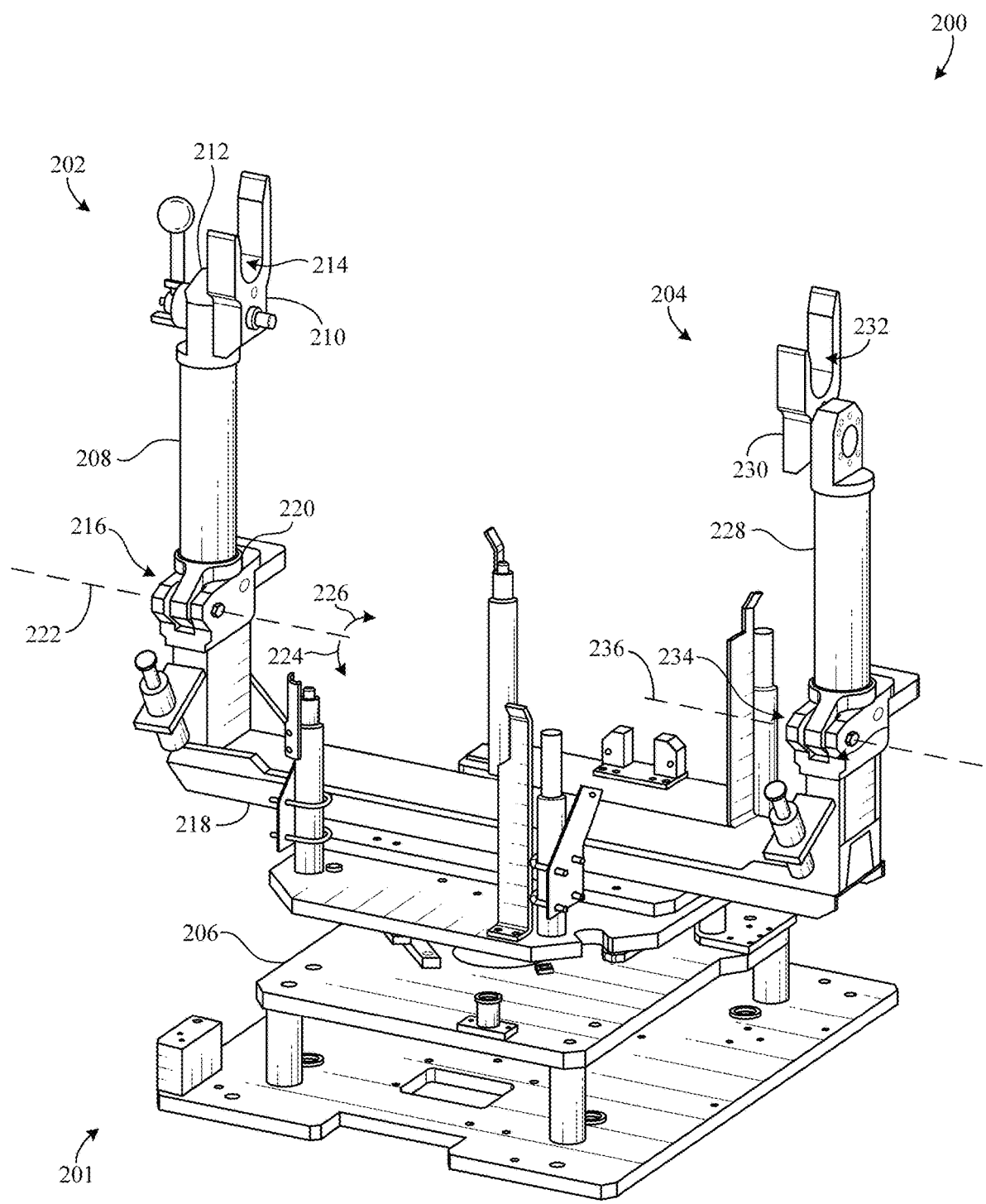
FIG. 2 is a view of an example object of interest in accordance with the teachings of this disclosure.

FIG. 2 is a view of an example object of interest (e.g., a pallet) 200 in accordance with the teachings of this disclosure. According to the illustrated example of FIG. 2, the object of interest 200 is a pallet (e.g., an engine pallet) 201 configured to receive and/or hold an example work piece (e.g., a portion of an engine such as a short block sub-assembly) when the pallet 201 is in an adjusted state. In such examples, to provide support to the work piece, the pallet 201 includes one or more example movable attachments 202, 204 positioned thereon, two of which are shown in this example (i.e., a first movable attachment 202 and a second movable attachment 204). Each of the attachment(s) 202, 204 of the pallet 201 is sometimes referred to as an adjustable portion of the pallet 201. In particular, each of the attachment(s) 202, 204 of the pallet 201 is adjustably coupled to an example base portion 206 of the pallet 201 supporting the attachment(s) 202, 204.

The first attachment 202 of FIG. 2 includes a first example arm 208 and a first example receptacle (e.g., a first cradle) 210 coupled to the first arm 208, for example, via one or more example fasteners and/or fastening methods or techniques. As shown in FIG. 2, the first receptacle 210 is positioned at or near (i.e., adjacent) a first end 212 of the first arm 208. In particular, a first example recessed area 214 formed and/or defined by the first receptacle 210 is sized, shaped, structured, and/or otherwise configured to receive a first portion of the workpiece.

In some examples, to enable movement of the first attachment 202, the pallet 201 includes a first example movable joint (e.g., a pin joint) 216 operatively coupled between the first arm 208 and a seventh example support structure 218 affixed to and/or extending at least partially across the base portion 206. The first arm 208 of FIG. 2 extends away from the first receptacle 210 to at least partially form the first joint 216 at or near a second end 220 of the first arm 208 opposite the first end 212. In such examples, the first arm 208, the first receptacle 210, and/or, more generally, the first attachment 202 is/are pivotable relative to the first joint 216 and/or a first example axis 222 associated with the first joint 216 in a second example direction (e.g., counterclockwise) 224 and/or a third example direction (e.g., clockwise) 226 opposite the second direction 224 between a first position (e.g., a lowered position) of the first attachment 202 and a second position (e.g., a raised position) of the first attachment 202 different relative to the first position. As shown in FIG. 2, the first attachment 202 is in the second position thereof. In such examples, the first attachment 202 is properly positioned when the first attachment 202 is in or near the second position thereof, which provides a partially adjusted state of the pallet 201 in some examples. Further, in some examples, the first attachment 202 locks in place when the first attachment is in the second position thereof.

Although FIG. 2 depicts aspects in connection with a single attachment 202, such aspects likewise apply to one or more other movable attachments associated with the pallet 201 such as, for example, the second attachment 204. For example, the second attachment 204 of FIG. 2 includes a second example arm 228 and a second example receptacle (e.g., a second cradle) 230 coupled to the second arm 228, for example, via one or more example fasteners and/or fastening methods or techniques. In particular, a second example recessed area 232 formed and/or defined by the second receptacle 230 is sized, shaped, structured, and/or otherwise configured to receive a second portion of the workpiece.

In some examples, to enable movement of the second attachment 204, the pallet 201 includes a second example movable joint (e.g., a pin joint) 234 operatively coupled between the second arm 228 and the seventh example support structure 218 affixed to the base portion 206. As shown in FIG. 2, the seventh support structure 218 extends across the base portion 206 from the first arm 208 to the second arm 228. In particular, in such examples, the second arm 228 and the second receptacle 230 are pivotable relative to the second joint 234 and/or a second example axis 236 associated with the second joint 234 in the second example direction 224 and/or the third example direction 226 between a first position (e.g., a lowered position) of the second attachment 204 and a second position (e.g., a raised position) of the second attachment 204 different relative to the first position. As shown in FIG. 2, the second attachment 204 is in the second position thereof. In such examples, the second attachment 204 is properly positioned when the second attachment 204 is in or near the second position thereof, which provides a partially adjusted state of the pallet 201 in some examples. Further, in some examples, the second attachment 204 locks in place when the second attachment 204 is in the second position thereof.

As such, in examples where the pallet 201 includes multiple (e.g., two or more) attachments 202, 204, the pallet 201 is in an adjusted state when each of the attachments 202, 204 is in the second position thereof. In such examples, the work piece is then placed on the attachment(s) 202, 204. Conversely, in such examples, the pallet 201 is in the unadjusted state thereof when each of the multiple attachments 202, 204 is in the first position thereof.

On the other hand, in examples where the pallet 201 includes a single attachment 202, 204, the pallet 201 is in the adjusted state when the single attachment 202, 204 is in the second position thereof. In such examples, the work piece is then placed on the single attachment 202, 204. Conversely, in such examples, the pallet 201 is in the unadjusted state thereof when the single attachment 202, 204 is in the first position thereof.

Figure 3:
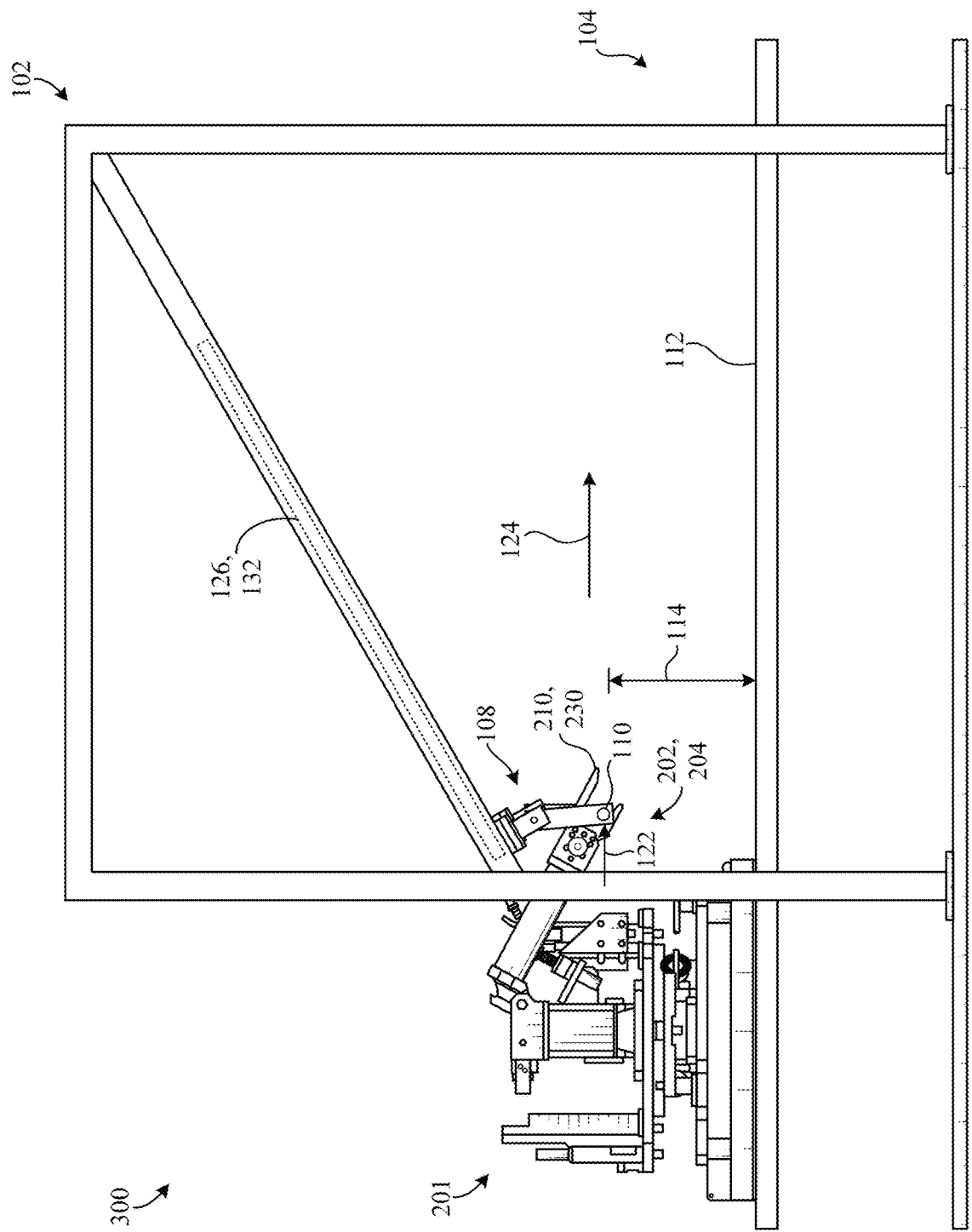
FIGS. 3 and 4 are side views of the example object adjuster of FIG. 1 and show the example object adjuster of FIG. 1 performing an object adjustment operation in accordance with the teachings of this disclosure.
Figure 4:
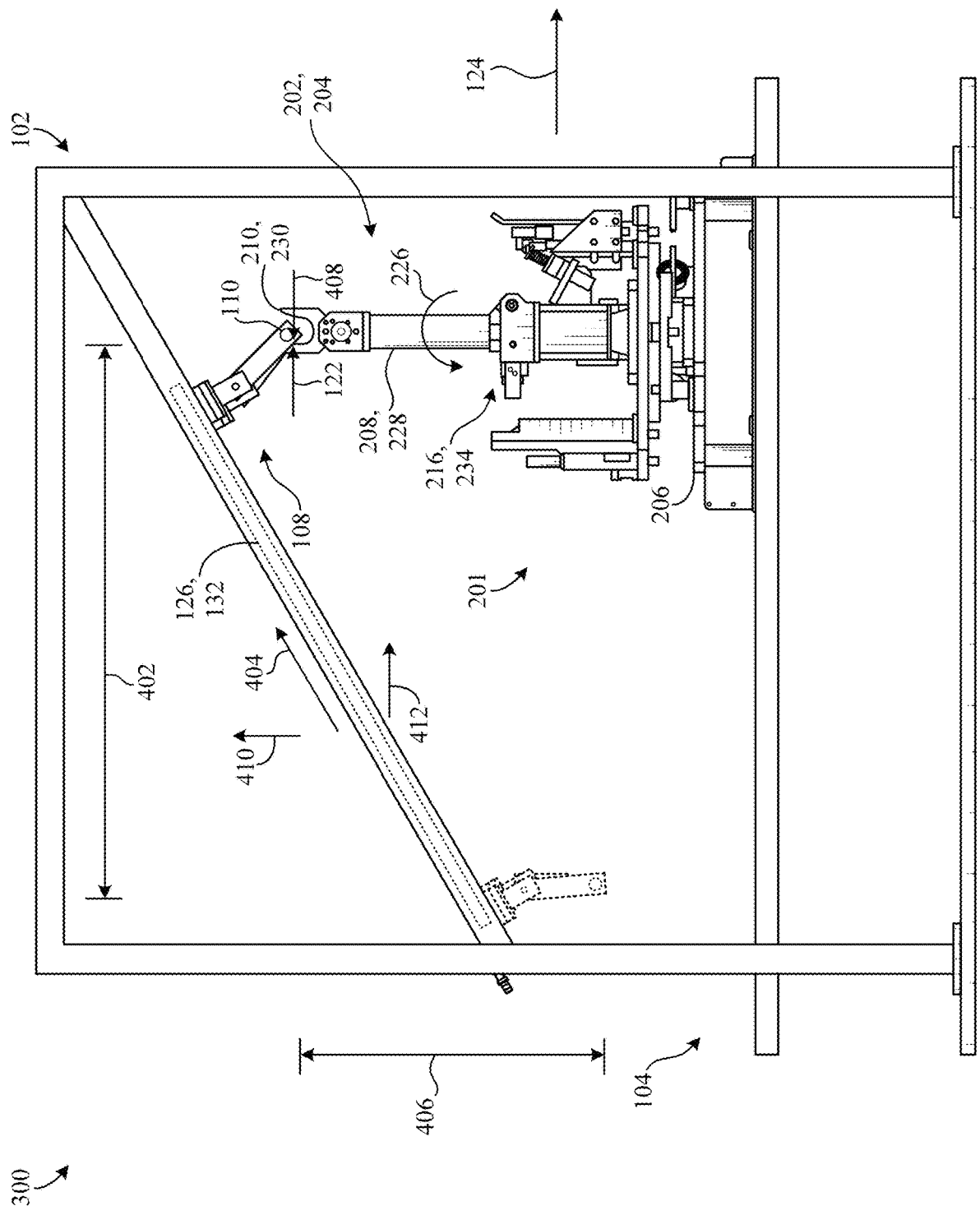

FIGS. 3 and 4 are side views of the example object adjuster 102 and show the object adjuster 102 performing an example object adjustment operation (e.g., a pallet adjustment operation) 300 in accordance with the teachings of this disclosure. For example, the object adjustment operation 300 of FIG. 3 occurs (e.g., one or more times) during an example production run or shift associated with the automotive manufacturing system 100. According to the illustrated examples of FIGS. 3 and 4, the pallet 201 is in the unadjusted state thereof and positioned on the conveyor 104. Further, the conveyor 104 of FIGS. 3 and 4 is moving the pallet 201 in the first direction 124 relative to the object adjuster 102, for example, via output generated by the conveyor actuator(s) 106. In such examples, the object adjuster 102 of FIGS. 3 and 4 is sometimes referred to as a pallet adjuster.

According to the illustrated example of FIG. 3, the conveyor 104 moves the pallet 201 in the first direction 124 and/or otherwise urges the pallet 201 toward the receiver 108. As the pallet 201 approaches the object adjuster 102, the movable attachment(s) 202, 204 of the pallet 201 engage at least a portion (e.g., the body 110) of the receiver 108. For example, the body 110 of the receiver 108 passes into the first recessed area 214 of the first receptacle 210 and/or the second recessed area 232 of the second receptacle 230 during movement of the pallet 201 such that the body 110 contacts at least one receptacle surface (e.g., a curved surface defined by a receptacle 210, 230). In such examples, such engagement between the pallet attachment(s) 202, 204 and the receiver 108 generate the first load 122. In particular, after the receiver 108 sufficiently receives the attachment(s) 202, 204, further movement of the pallet 201 in the first direction 124 operates the object adjuster 102 and/or otherwise pushes the receiver 108 at least partially across the guide(s) 126, 132 (i.e., across at least a portion of the path(s) 130, 136), as discussed further below.

In some examples, to facilitate catching the attachment(s) 202, 204 via the body 110, the receiver 108 is positioned at or near a first example position (e.g., in initial or lowered position) of the receiver 108 relative to the guide(s) 126, 132 before a pallet 201 is adjusted via the object adjuster 102. As shown in FIG. 3, the receiver 108 is in the first position thereof, which corresponds to end(s) of the respective guide(s) 126, 132. In particular, the body 110 is aligned to the attachment(s) when the receiver 108 is in the first position thereof and the pallet 201 is positioned on the conveyor 104 and in the unadjusted position thereof. That is, according to the illustrated example of FIG. 3, the receptacle(s) 210, 230 and the body 110 form the same clearance 114 with the conveyor surface 112. In other words, the receptacle(s) 210, 230 of FIG. 3 and the body 110 of FIG. 3 are spaced by substantially the same distance from the conveyor surface 112.

According to the illustrated example of FIG. 4, the conveyor 104 moved the pallet 201 in the first direction 124 substantially through the object adjuster 102, for example, across a second example distance (e.g., a horizontal distance) 402. As the pallet 201 moves across the second distance 402 to execute the object adjustment operation 300, the body 110 and the receptacle(s) 210, 230 remain substantially engaged with each other. As a result, the first load 122 imparted on the body 110 causes the receiver 108 to move in a fourth example direction 404 defined by the guide(s) 126, 132 across the second distance 402 and a third example distance (e.g., a vertical distance) 406 from the first position (as represented by the dotted/dashed lines of FIG. 4) of the receiver 108 to a second example position (e.g., a final or raised position) of the receiver 108. In other words, the receiver 108 slides up the guide(s) 126, 132 in response to the first load 122 being imparted on the body 110. In particular, at least a portion (e.g., the body 110) of the receiver 108 imparts a second example force or load (e.g., a load having a same magnitude and an opposite direction relative to the first load 122) 408 on each of the attachment(s) 202, 204 and/or otherwise provides resistance to each of the attachment(s) 202, 204 as the pallet 201 moves across the second distance 402. As a result, in response to receiving the second load 408 from the body 110, each of the attachment(s) 202, 204 pivot relative to the base portion 206 in the third direction 226. Thus, in such examples, the receiver 108 and the attachment(s) 202, 204 are configured to move each other when the conveyor 104 conveys the pallet 201. In this manner, the object adjuster 102 adjusts the pallet 201 and/or otherwise provides the adjusted state of the pallet 201. As shown in FIG. 4, the pallet 201 is in the adjusted state thereof.

The third distance 406 of FIG. 4 corresponds to a displacement (e.g., a vertical displacement) of the pallet attachment(s) 202, 204. For example, when the first attachment 202 (and/or the second attachment 204) rotates from the first position to the second position, the first receptacle 210 travels across the third distance 406. Thus, in such examples, the guide(s) 126, 132 are shaped and/oriented to extend across the third distance 406, which allows for the attachment(s) 202, 204 to sufficiently pivot relative to the pallet 201 during the object adjusting operation 300.

In some examples, the body 110 causes the first arm 208, the first receptacle 210, and/or, more generally, the first pallet attachment 202 to pivot relative to the first joint 216 in the third direction 226 from the first position of the first attachment 202 to the second position of the first attachment 202 in response to the pallet 201 moving along the conveyor 104 in the first direction 124 across the second distance 402. In some such examples, the first attachment 202 locks in the second position after reaching the second position. Additionally or alternatively, in some examples, the body 110 causes the second arm 228, the second receptacle 230, and/or, more generally, the second attachment 204 to pivot relative to the second joint 234 in the third direction 226 from the first position of the second attachment 204 to the second position of the second attachment 204 in response to the pallet 201 moving along the conveyor 104 in the first direction 124 across the second distance 402. In some such examples, the second attachment 204 locks in the second position after reaching the second position.

As previously mentioned, in some examples, the controller 166 is communicatively coupled to the conveyor actuator(s) 106 to control the conveyor 104 and/or movement of the pallet 201. In such examples, the controller 166 is configured to direct the conveyor actuator(s) 106 to carry out the object adjustment operation 300. In this manner, the automotive manufacturing system 100 adjusts the pallet 201 and/or one or more other objects of interest 200 via the object adjuster 102.

The fourth direction 404 of FIG. 4 includes a first component (e.g., a vertical component) and a second component (e.g., a horizontal component). As such, the receiver 108 moves at least partially in a vertical direction 410 away from the conveyor surface 112 and a horizontal direction 412 in response to the body 110 receiving the first load 122.

Figure 5:
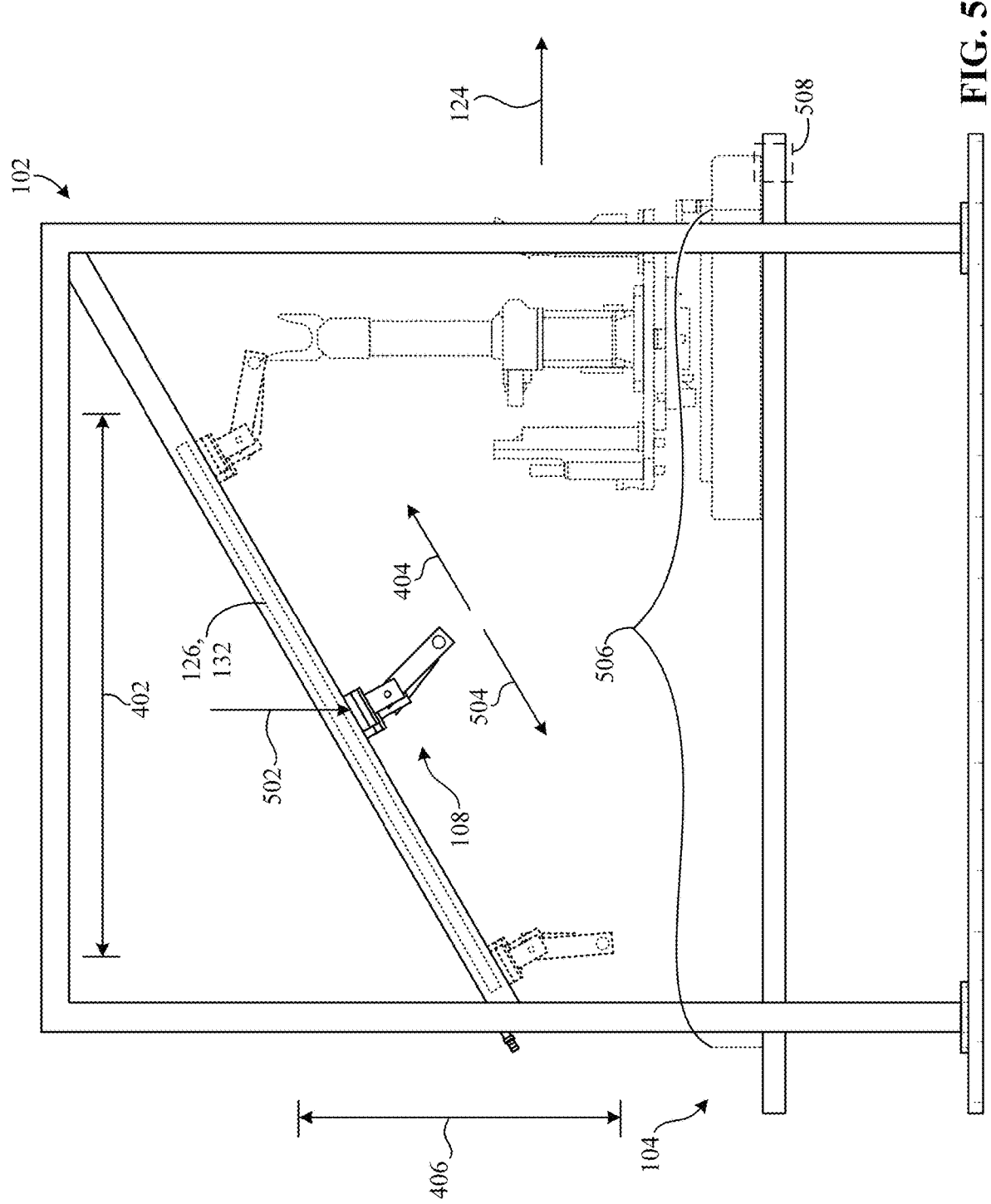
FIG. 5 is another side view of the example object adjuster of FIG. 1 and shows the example object adjuster of FIG. 1 after performing an example object adjustment operation.

FIG. 5 is another side view of the example object adjuster 102 of FIG. 1 and shows the example object adjuster of FIG. 1 after performing the object adjustment operation 300 shown in FIGS. 3 and 4. According to the illustrated example of FIG. 5, the conveyor 104 has moved the pallet 201 (as represented by the dotted/dashed lines of FIG. 5) in the first direction 124 past the object adjuster 102. In particular, in such examples, after the pallet attachment(s) 202, 204 disengage or disconnect from the body 110 and/or, more generally, from the receiver 108, a third example force or load (e.g., a gravitational force) 502 imparted on the receiver 108 causes the receiver 108 to move in a fifth example direction 504, opposite the fourth direction 404, defined by the guide(s) 126, 132 across the second distance 402 and the third distance 406 from the second position (as represented by the dotted/dashed lines of FIG. 5) of the receiver 108 toward or to the first position (as represented by the dotted/dashed lines of FIG. 5) of the receiver 108. In other words, the receiver 108 slides down the guide(s) 126, 132 in response the third load 502 being imparted on the receiver 108 after completion of the object adjustment operation 300. In this manner, disclosed examples reset the object adjuster 102 and/or otherwise reposition the receiver 108 via a weight of the receiver 108 and/or gravity.

As shown in FIG. 5, the conveyor 104 includes an example area of interest 506 positioned near the object adjuster 102 that is vacant or void of any object of interest. In such examples, the object adjustment operation 300 occurs when the pallet 201 (and/or a different object of interest) travels across at least a portion the area of interest 506. That is, according to the illustrated example of FIG. 5, the conveyor 104 conveyed the pallet 201 past the object adjuster 102 through and/or out of the area of interest 506.

In some examples, to facilitate determining when the area 506 is clear, the automotive manufacturing system 100 includes one or more example sensors 508 positioned near the conveyor area 506 and communicatively coupled to the controller 166. The sensor(s) 508 of FIG. 5 include one or more optical sensors, one or more laser sensors, one or more proximity sensors (e.g., inductive proximity sensor(s)), etc., and/or any other appropriate sensor(s). In particular, in such examples, the sensor(s) 508 are configured to generate data that is associated with an object of interest (e.g., the pallet 201) and indicative of any one or more (a) a location of the object of interest relative to the conveyor 104, (b) a location of the object of interest relative to the object adjuster 102, (c) a location of the object of interest relative to the sensor(s) 508, and/or (d) a presence of the of the object of interest. The sensor(s) 508 provide such data to the controller 166, which allows the controller 166 to determine when to perform one or more subsequent object adjustment operations 300.

In some examples, the controller 166 is configured to detect, via the sensor(s) 508, the pallet 201 when the pallet 201 is positioned in the area of interest 506. Additionally, in some examples, the controller 166 is configured to determine, via the sensor(s) 508, whether and/or when the area of interest 506 is substantially vacant.

Figure 6:
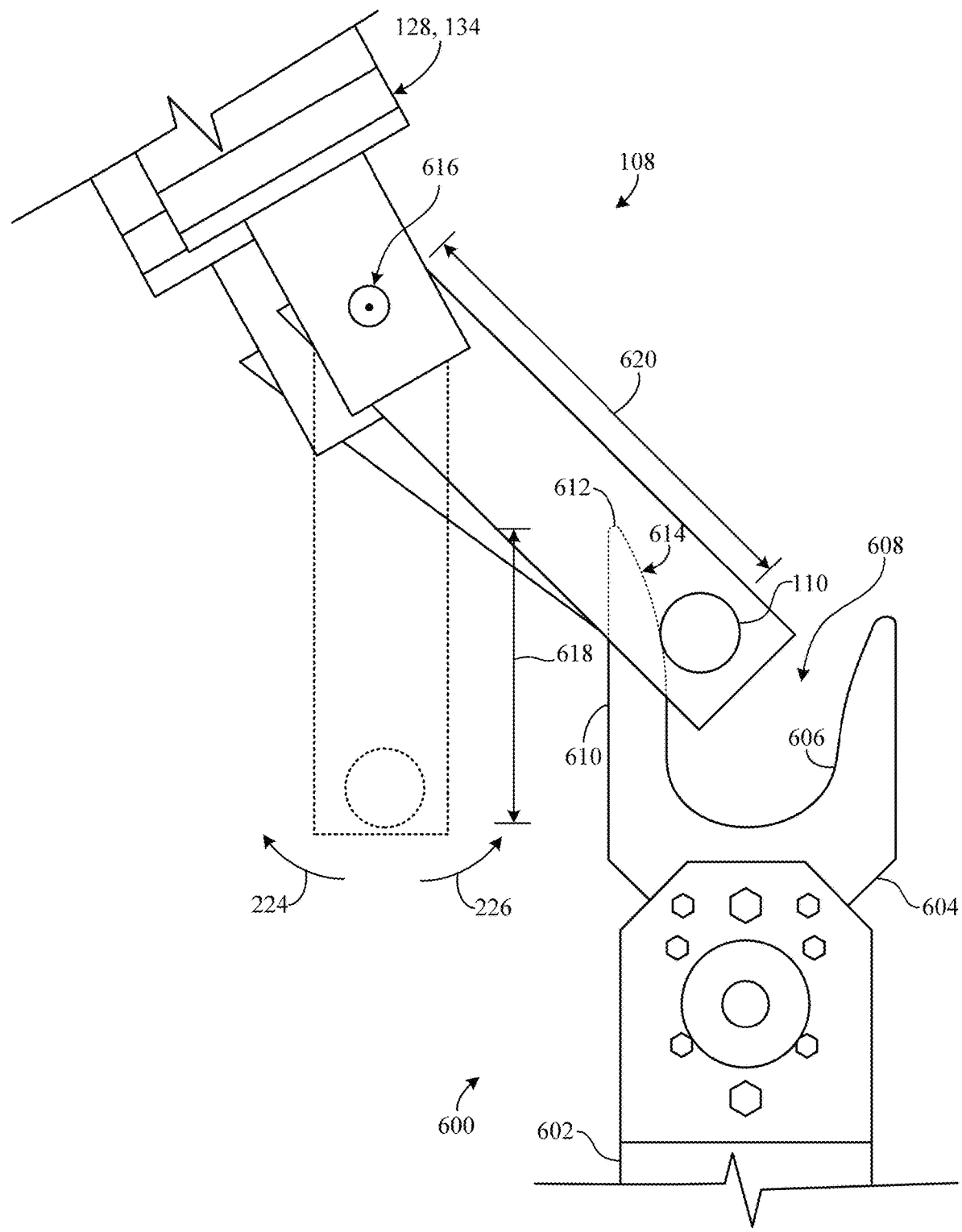
FIG. 6 is an enlarged partial view of an example object attachment and an example receiver in accordance with the teachings of this disclosure.

FIG. 6 is an enlarged partial view of a third example attachment 600 for an object of interest and the receiver 108. In some examples, the third pallet attachment 600 of FIG. 6 corresponds to the first pallet attachment 202 and/or the second pallet attachment 204. For example, the third pallet attachment 600 of FIG. 6 includes a third example arm 602 and a third example receptacle 604 coupled to the third arm 602. According to the illustrated example of FIG. 6, the third pallet attachment 600 is in a raised position and engaging the body 110, for example, when the pallet adjustment operation 300 is near completion.

In some examples, to facilitate engagement and/or disengagement between the receiver 108 and the third attachment 600, the third receptacle 604 includes an example abutment surface 606 forming and/or defining a third example recessed area 608 of the third attachment 600 configured to receive the body 110. As such, the body 110 of FIG. 6 is slidable along the abutment surface 606 during the object adjustment operation 300. In such examples, when the receiver 108 is approaching an end of the guide(s) 126, 132 and/or the second position of the receiver 108, the body 110 slides along the abutment surface 606 at least partially across a first portion (e.g., a finger) 610 of the third receptacle 604 from a central area in the third recessed area 608 toward or to an end 612 of the first portion 610. In particular, the abutment surface 606 includes an example area 614 that is positioned on the first portion 610 and curved and/or angled, which allows the body 110 to slide and/or roll off the abutment surface 606 and past the end 612 of the first portion 610.

Additionally, in some examples, to further facilitate disengaging the receiver 108 and the third attachment 600, the receiver 108 of FIG. 6 includes one or more example movable joints (e.g., one or more pin joints) 616 operatively coupled between the body 110 and respective ones of the adapter(s) 128, 134, one of which is shown in this example (i.e., a first one of the movable joint(s) 616). In such examples, the body 110 pivots relative to the joint(s) 616 in the second direction 224 and/or the third direction 226 between a first position (e.g., a lowered position) (as represented by the dotted/dashed lines of the FIG. 6) of the body 110 and a second position (e.g., a raised position) of the body 110. In particular, the body 110 moves across a fourth example distance (e.g., a vertical distance) 618 during rotation of the body 110 relative to the joint(s) 616. As a result, in such examples, the body 110 follows the abutment surface 606 at least partially across a length of the first portion 610 to the end of 612 of the first portion 610, for example, while each of the adapter(s) 128, 134 remains substantially in a constant position relative to the respective guide(s) 126, 132. Accordingly, in such examples, the guide(s) 126, 132 may have a shorter length while still allowing sufficient decoupling between the body 110 and the third receptacle 604. Additionally, such movement of the body 110 provided by the joint(s) 616 accounts for variation in position(s) of the respective attachment(s) 202, 204, for example, when the pallet 201 approaches the object adjuster 102 and/or during the object adjusting operation 300.

As shown in FIG. 6, the body 110 is spaced from the joint(s) 616 of the receiver 108 by a fifth example distance 620, which affects a trajectory of the body 110 during rotation of the body 110 relative to the joint(s) 616, as discussed further below in connection with FIGS. 11, 12A, and 12B. In such examples, as the fifth distance 620 decreases, an angle across which the body 110 is to rotate relative to the joint(s) 616 in the third direction 226 to disengage from the third receptacle 604 increases. Conversely, as the fifth distance 620 increases, that angle decreases.

Although FIG. 6 depicts aspects in connection with a single object attachment 600, in some examples, such aspects likewise apply to one or more other object attachments such as, for example, the first pallet attachment 202 of FIGS. 2-4 and/or the second pallet attachment 204 of FIGS. 2-4.

Figure 7:
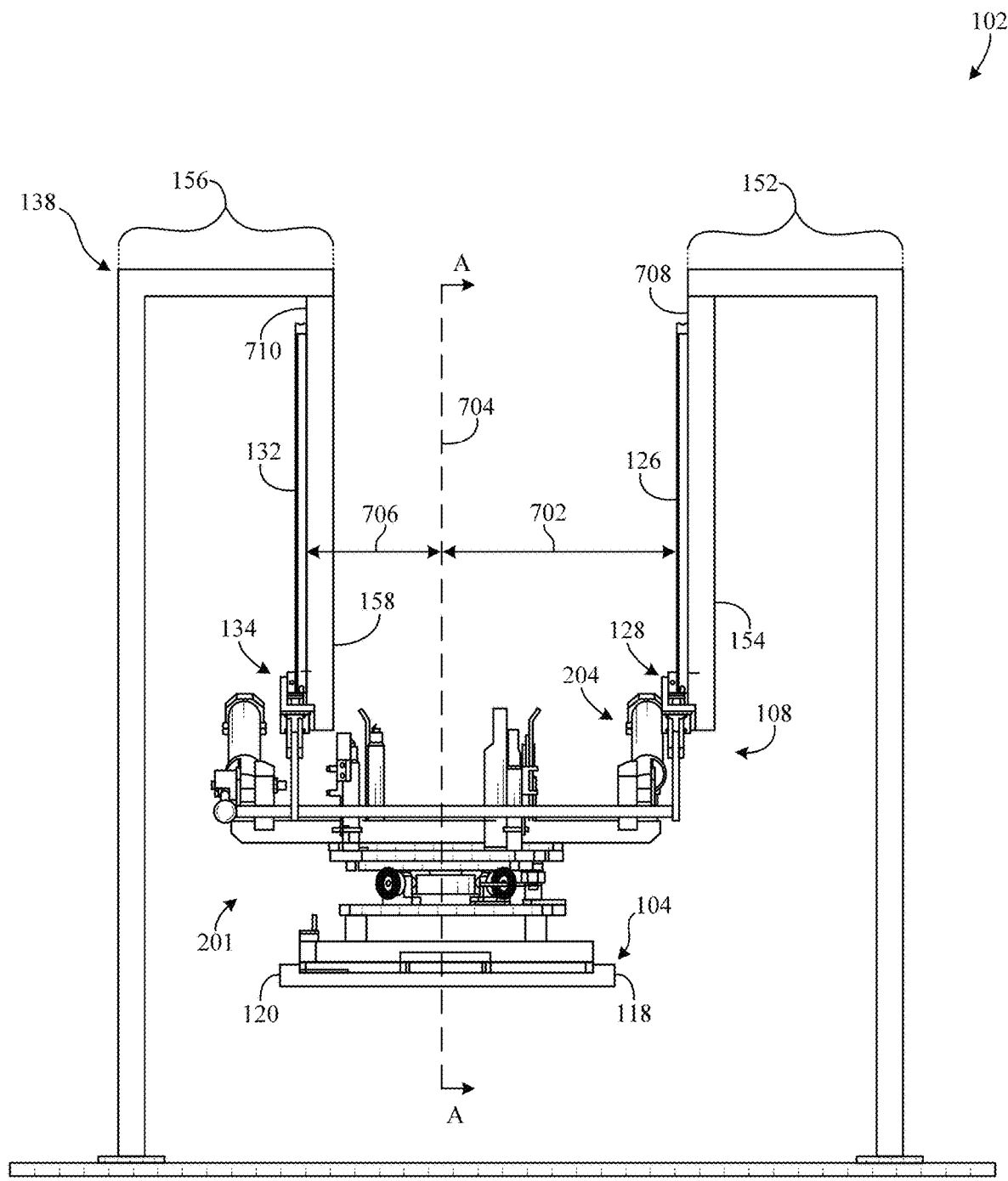
FIG. 7 is a front view of the example object adjuster of FIG. 1.

FIG. 7 is a front view of the example object adjuster 102 of FIG. 1. According to the illustrated example of FIG. 7, the first frame 138 of the object adjuster 102 is offset relative to the conveyor 104. For example, as shown in FIG. 7, the first guide 126 and/or the first frame portion 152 are spaced by a sixth example distance (e.g., a horizontal distance) 702 from a third example axis (e.g., a central axis) 704 associated with the conveyor 104. Further, the second guide 132 and/or the second frame portion 156 are spaced by a seventh example distance (e.g., a horizontal distance) 706 from the third axis 704. In some examples, the sixth distance 702 is different (e.g., greater) than the seventh 706 distance, as shown in FIG. 7. However, in certain manufacturing applications, the sixth distance 702 is substantially the same relative to the seventh distance 706. That is, in such examples, a value corresponding to the sixth distance 702 is equal to or 5% greater or less than a value corresponding to the seventh distance 706. The third axis 704 of FIG. 7 extends through a central portion or area of the conveyor 104, for example, between the first and second sides 118, 120 of the conveyor 104. In particular, in such examples, when the receiver 108 is in the first position thereof, none of the components of the object adjuster 102 interferes with the pallet 201 during the object adjustment operation 300.

As shown in FIG. 7, the first adapter 128 is not aligned to the second pallet attachment 204 and/or is otherwise offset relative to the second pallet attachment 204. As a result, in such examples, the first adapter 128 does not contact the second pallet attachment 204 and/or any other portion of the pallet 201 during the pallet adjustment operation 300. Similarly, in some such examples, the second adapter 134 is not aligned to the first pallet attachment 202 and/or is otherwise offset relative to the first pallet attachment 202. As a result, in such examples, the second adapter 134 does not contact the first pallet attachment 202 and/or any other portion of the pallet 201 during the pallet adjustment operation 300. Further, in such examples, the first guide 126 is positioned at or near (i.e., adjacent) the first side 118 of the conveyor 104 and the second guide 132 is positioned at or near the second side 120 of the conveyor 104.

In some examples, to further accommodate the configuration of the pallet 201, the first guide 126 is positioned on a leftmost (in the orientation of FIG. 7) side 708 of the fifth support structure 154, and the second guide 132 is position on a leftmost (in the orientation of the FIG. 7) side 710 of the sixth support structure 158. However, in some examples, the first guide 126 of FIG. 7 is positioned differently relative to the fifths support structure 154. Further, in some examples, the second guide 132 is positioned differently relative to the sixth support structure 158.

In some examples, the first portion 152 of the first frame 138 is substantially similarly or the same relative to the second portion 156 of the first frame 138, as shown in FIG. 7. However, in some examples, the first portion 152 and/or the second portion 156 are implemented differently. Although FIG. 7 depicts the first frame 138 and/or, more generally, the object adjuster 102 being offset relative to the conveyor 104, in some example, the object adjuster 102 is implemented differently to similarly prevent interference between the components of the object adjuster 102 and a pallet. Further, although FIGS. 2-7 depict the pallet 201, in some examples, the object adjuster 102 is advantageously used to adjust one or more different objects of interest 200 conveyable along the conveyor 104, as previously mentioned.

FIG. 8 is a cross-sectional view of the object adjuster 102 along line A-A of FIG. 7 and shows the first guide 126. As shown in FIG. 8, the first guide 126 extends along a linear path from a first end 800 of the first guide 126 to a second end 802 of the first guide 126 opposite the first end 800. In such examples, the first guide 126 is angled and/or inclined such that a first portion (e.g., the example rail 1112 of FIG. 11) of the first guide 126 and a horizontal axis 804 form and/or define an example angle 806, for example, between about 15 degrees and about 45 degrees. As shown in FIG. 8, the angle 806 is about 30 degrees. In some examples, the first guide 126 and the surface 112 of the conveyor 104 form and/or define the angle 806. In particular, the first guide 126 is positioned and/or orientated such that first guide 126 extends across the third distance 406, as previously mentioned. By providing such an angled and/or inclined orientation of the first guide 126, disclosed examples reduce a load (e.g., the first load 122) required to operate the object adjuster 102 and/or friction force(s) experienced by the guide(s) 126, 132, which prevents the load from wearing, degrading, and/or otherwise causing damage to the object adjuster 102 and/or a pallet 201.

Although FIG. 8 depicts the first guide 126 extending along a substantially straight or linear path, in some examples, the first guide 126 is implemented differently. In some such examples, the first guide 126 is curved and/or otherwise includes one or more portions that are curved. That is, in such examples, the first portion of the first guide 126 extends along a curved path from the first end 800 of the first guide 126 to the second end 802 of the first guide 126. As a result, in such examples, the first guide 126 guides movement of the first adapter 128 and, thus, the receiver 108 along a curved path 810 between the first and second ends 800, 802 of the first guide 126. As such, the related adjustment(s) associated with the attachment(s) 202, 204 are based on movement of the pallet 201 relative to the object adjuster 102 as well as the shape of the guide(s) 126, 132.

As shown in FIG. 8, the first stopper 172 is positioned at or near the first end 800 of the first guide 126. In particular, the first stopper 172 provides the first position of the receiver 108 when the first adapter 128 is engaged with the first stopper 172, as shown in FIG. 8.

Figure 9:
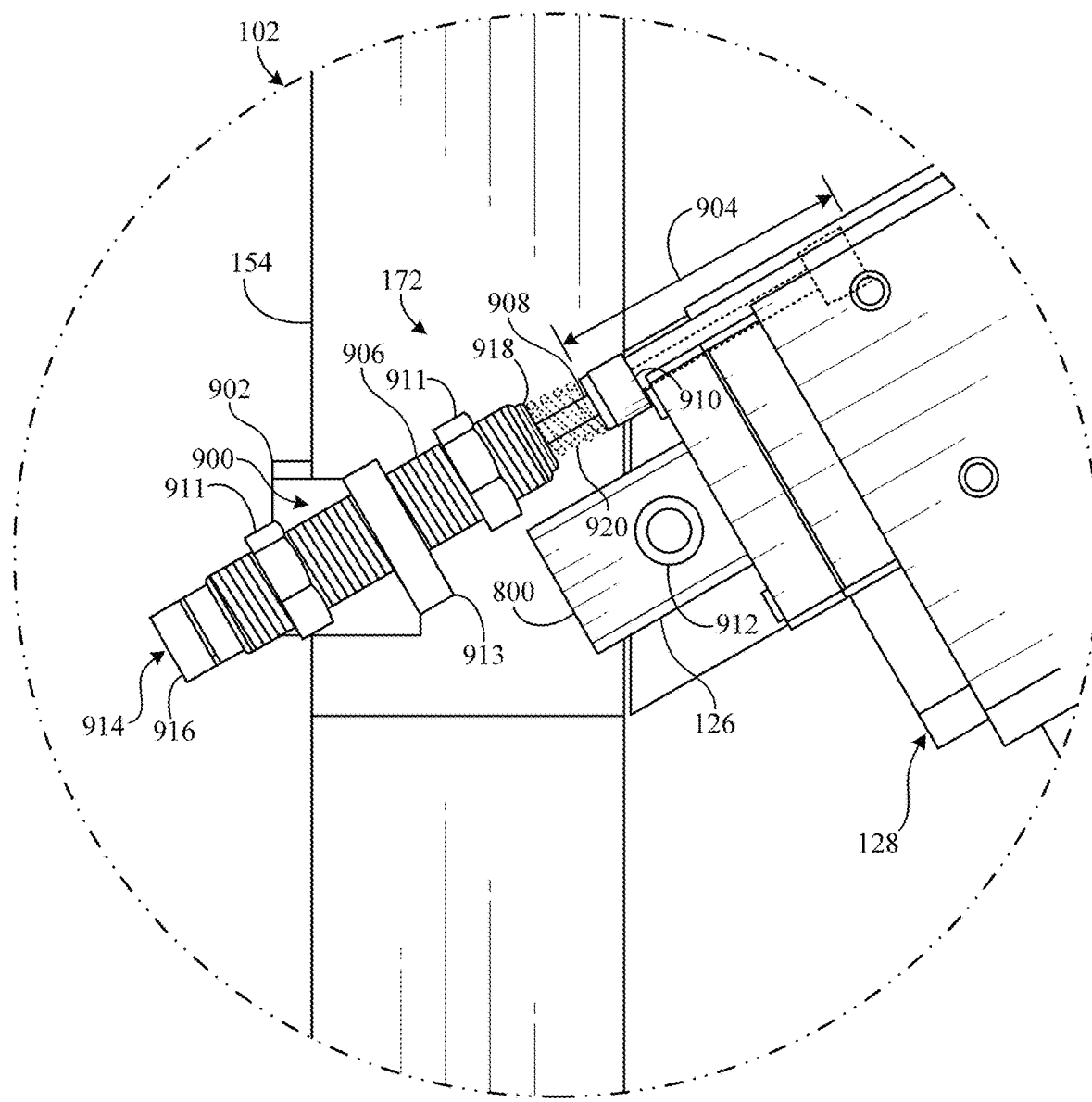
FIG. 9 is an enlarged portion view of the example object adjuster of FIG. 1 and shows an example stopper in accordance with the teachings of this disclosure.

FIG. 9 is an enlarged portion view of the example object adjuster 102 of FIG. 1 and shows the first stopper 172. As previously mentioned, the first stopper 172 is configured to control movement of the receiver 108, for example, (a) cooperatively or together with one or more other stoppers (e.g., the second stopper 174) or (b) without any other stopper(s). According to the illustrated example of FIG. 9, the first stopper 172 includes a first example damper (e.g., a fluid damper such as a shock absorber or a spring damper) 900 coupled to the fifth support structure 154 via a first example bracket 902. That is, the first bracket 902 of FIG. 9 is interposed between and/or coupled between the first damper 900 and the fifth support structure 154, for example, via one or more example fasteners and/or one or more example fastening methods or techniques. In such examples, the first bracket 902 of FIG. 9 is sized, shaped, structure, and/or otherwise configured to sufficiently support the first damper 900 and/or any other component of the first stopper 172. In particular, in such examples, the first damper 900 is configured to dampen movement of the first adaptor 128 and/or more generally, the receiver 108 when the receiver 108 travels along the first guide 126 near the first end 800 of the first guide 126 across an example stopping distance 904.

In some examples, the first stopper 172 includes a first example body or housing (e.g., forming and/or defining an internal fluid chamber) 906 and a first example rod (e.g., a piston rod) 908 slidably disposed in the first housing 906. In particular, the first rod 908 and first housing 906 generate and/or otherwise provide a damping effect when the first rod 908 moves into and/or out of a chamber (e.g., a fluid chamber or spring chamber) in the first housing 906. For example, in response to the first adapter 128 engaging an end (e.g., a cap) 910 of the first rod 908, the first rod 908 is configured to move across the stopping distance 904 from a first position (e.g., an extended position) (as represented by the dotted/dashed lines of FIG. 9) in which the end 910 is to receive the first adapter 128 to a second position (e.g., a retracted position) (shown in FIG. 9), which (a) causes a fluid (e.g., oil) in the chamber to flow through one or more orifices fluidly coupled to the chamber and/or (b) changes a state of a spring damping element. In any case, as a result of such displacement of the first rod 908, the first damper 900 decelerates the first adapter 128 via a force (sometimes referred to as an impact force) imparted on the first adapter 128 by the end 910 and, thus, decelerates the receiver 108 and/or stops or ceases movement thereof.

Additionally, in some examples, to secure the first housing 906 to the first bracket 902, the first stopper 172 also includes one or more example primary fasteners (e.g., one or more nuts) 911 threadably coupled to an outer surface (e.g., a threaded surface) of the first housing 906, two of which are shown in this example. In such examples, rotation of the primary fastener(s) 911 relative to the first housing 906 urges the primary fastener(s) 911 to move along a length of the first housing 906 between opposing ends of the first housing 906, which facilitates positioning the first housing 906 relative to the first bracket 902. In particular, to assemble the first damper 900 and the first bracket 902, each of the primary fasteners 911 of FIG. 9 is adjusted relative to (e.g., screwed onto) the first housing 906 from one of the opposing ends until the primary fastener 911 is engaging (e.g., substantially flush against) an example abutment portion 913 of the first bracket 902. In this manner, the primary fasteners 911 couple (e.g., adjustably couple) the first housing 906 to the first bracket 902. In such examples, a user can set and/or otherwise change the stopping distance 904 associated with the first ravel stop 172, for example, via adjusting a position of the first housing 906 relative to the first bracket 902 and/or adjusting the primary fastener(s) 911 to accommodate such a positional change of the first housing 906.

The first housing 906 of FIG. 9 is sized, shaped, structure, and/or otherwise configured to slidably receive at least a portion of the first rod 908, as previously mentioned. In particular, the first damper 900 includes one or more example damping elements (e.g., fluid(s) such as air, oil, etc. and/or a coil spring) operatively coupled to the first housing 906 and configured to generate the damping effect when the first rod 908 moves relative to the first housing 906. That is, in such examples, the damping element(s) impart a force a load on the first rod 908 during operation of the first damper 900, a magnitude of which is based on one or more parameters (e.g., one or more of a velocity, an acceleration, etc.) associated with such movement of the first rod 908 in addition to parameters and/or characteristics associated with the damping element(s).

In some examples, the first rod 908 ceases moving when the first rod 908 is in the second position thereof, which ceases movement of the receiver 108. In such examples, the first damper 900 stops the receiver 108 from moving along the first guide 126 in the fifth direction 504 and/or otherwise provides the first position of the receiver 108 after completion of the object adjustment operation 300.

Additionally or alternatively, in some examples, to cease a movement of the receiver 108, the first stopper 172 includes an example auxiliary fastener (e.g., a bolt) 912 coupled to the first guide 126, for example, via one or more example fastening methods or techniques (e.g., via any one or more of welding, adhesion, snap fitting, etc.). As shown in FIG. 9, the auxiliary fastener 912 is positioned on the first guide 126 at or near (i.e., adjacent) the first end 800 thereof. In particular, in such examples, the auxiliary fastener 912 is configured to engage at least a portion of the first adaptor 128 to stop the first adaptor 128 from moving along the first guide 126 in the fifth direction 504 to provide the first position of the receiver 108.

Additionally, in some examples, to change a parameter and/or a characteristic associated with the damping effect, the first stopper 172 also includes an example adjustment portion (e.g., an adjusting knob) 914 positioned at a first end 916 of the first housing 906 opposite a second end 918 of the first housing 906. In particular, the adjustment portion 914 is operatively coupled to the first housing 906 such that, when a user interacts with the adjustment portion 914 (e.g., via a tool inserted into a slot positioned on the adjustment portion 914), a space or volume of the chamber changes (e.g., increases or decrease), which affects a rate at which the fluid in the chamber is expelled therefrom via the orifice(s). As a result of such interaction with the adjusting portion 914, the impact force experienced by the first stopper 174 changes (e.g., increases or decreases) accordingly. Thus, the adjustment portion 914 of FIG. 9 enables the first stopper 172 to accommodate a variety of impact forces associated with reducing a velocity of the receiver 108. Thus, if one or more of the receiver 108, the guide(s) 126, 132, and/or, more generally, the object adjuster 102 is/are configured differently or in a manner that would alter the impact force experienced by the first stopper 172, the user may interact with the adjustment portion 914 to account for this change in impact force (e.g., without having to select a different stopper), which would have otherwise been unattainable using some stopper configurations (e.g., a spring stopper configuration or a rubber stopper configuration).

Although FIG. 9 depicts the first damper 900 as a fluid damper, in some examples, the first stopper 172 is implemented differently, for example, using a spring damper formed and/or defined by the first housing 906 and the first rod 908 to similarly decelerate the first adapter 128. In some such examples, the first stopper 172 includes an example spring damping element (e.g., a coil spring) 920 operatively coupled to the first rod 908 and the first housing 906, as represented by the dotted/dashed lines of FIG. 9. For example, as shown in FIG. 9, the spring damping element 920 is interposed between the end 910 of the first rod 908 and the second end 918 of the first housing 906. However, in some examples, the spring damping element 920 is positioned differently relative to the first housing 906 (e.g., in the chamber of the first housing 906) and/or the first rod 908. In particular, relative movement between the first housing 906 and the first rod 908 compresses, decompresses, and/or otherwise changes a state of the spring damping element 920, which similarly provides the damping effect for the first adapter 128. Further, in such examples, the stopping distance 904 is substantially based on one or more parameters and/or characteristics associated with the spring damping element 920 such as, for example, any of a spring length, a spring stiffness, a spring diameter, etc. Accordingly, the spring damping element 920 of FIG. 9 is sized, shaped, structured, and/or otherwise configured accordingly to provide a desired or sufficient stopping distance.

Although FIG. 9 depicts aspects in connection with a single stopper 172, in some examples, such aspects likewise apply to one or more other stoppers associated with the object adjuster 102 in addition or alternatively to the first stopper 172 such as, for example, the second stopper 174.

Figure 10:
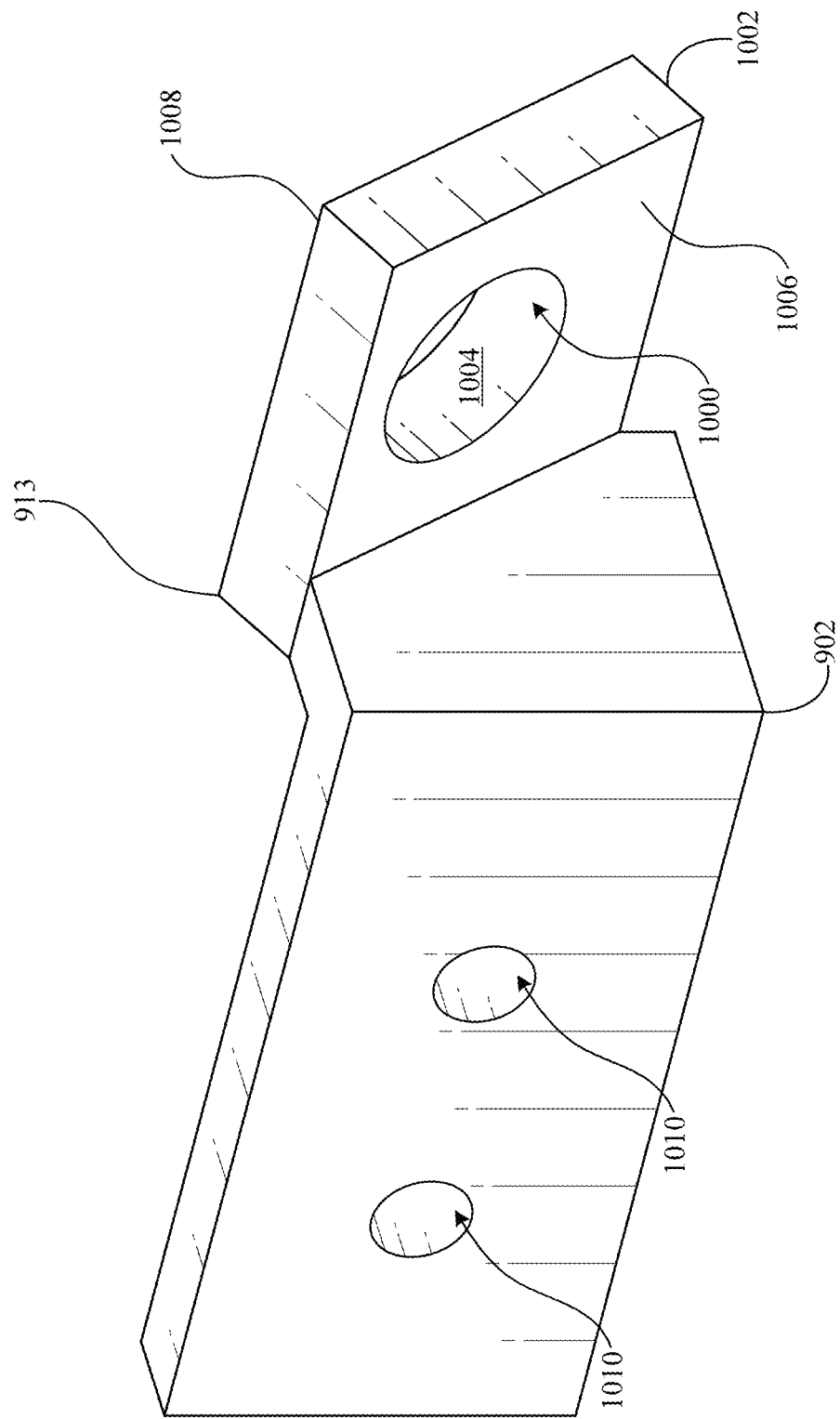
FIG. 10 is a view of an example bracket in accordance with the teachings of this disclosure.

FIG. 10 is a view of the first bracket 902 associated with the first stopper 172. In some examples, to facilitate holding the first damper 900, the first bracket 902 of FIG. 9 includes a primary example aperture (e.g., a bore or circular opening) 1000 positioned thereon at or near a first end 1002 of the first bracket 902. In particular, the primary aperture 1000 is sized, shaped, structured, and/or otherwise configured to receive at least a portion of the first damper 900. For example, to assemble the first damper 900 and the first bracket 902, an end of the first housing 906 is first aligned to the primary aperture 1000. Then, the end of the first housing 906 is inserted into and/or positioned in the primary aperture 1000, for example, such that an inner surface 1004 formed and/or defined by the primary aperture 1000 squeezes or contacts an outer surface of the first damper 900. In this manner, disclosed examples couple the first bracket 902 and the first damper 900 together. However, in some examples, the outer surface of the first housing 906 does not contact or only partially contacts the inner surface 1004 (e.g., a diameter of the first housing 906 is slightly or substantially smaller relative to a diameter of the primary aperture 1000).

Additionally or alternatively, in some examples, the abutment portion 913 and the primary fasteners 911 facilitate coupling the first damper 900 and the first bracket 902 together, as previously mentioned. According to the illustrated example of FIG. 10, the abutment portion 913 is formed and/or defined by the first bracket 902 such that the first bracket 902 and the abutment portion 913 form a single-piece or integral component. However, in some examples, the first bracket 902 and the abutment portion 913 are separate components that are coupled together, for example, via one or more example fasteners and/or one or more example fastening methods or techniques. In particular, the abutment portion 913 of FIG. 10 includes a first surface or face 1006 and a second surface or face 1008 opposite the first face 1006, each of which is configured to engage a respective one of the primary fasteners 911. For example, the primary fasteners 911 are threadably coupled (e.g., screwed on) to the first housing 906 such that the primary fasteners 911 clamp the abutment portion 913 and/or otherwise impart forces on the respective faces 1006, 1008. In this manner, disclosed examples couple the first bracket 902 and the first damper 900 together and/or better secure a position of the first damper 900 relative to the first bracket 902. Thus, in such examples, as long as the primary fasteners 911 maintain sufficient engagement with the respective first and second faces 1006, 1008, the first housing 906 may be loosely fitted within the aperture 1000. Further, such a connection provided by the primary fasteners 911 and the abutment portion 913 allows for the first stopper 172 to brace against the second face 1008 of the bracket 902 while absorbing the impact load(s) associated with the receiver 108.

In some examples, to facilitate coupling the first bracket 902 to part of the first frame 138, the first bracket 902 of FIG. 10 also includes one or more secondary apertures (e.g., one or more bores and/or circular openings) 1010, two of which are shown in this example. Each of the secondary aperture(s) is sized, shaped, structure, and/or otherwise configured to receive an example fastener (e.g., one of a bolt, a stud, a screw, a rivet, etc.). In such examples, after the first bracket 902 and the first damper 900 are assembled, the first bracket 902 is positioned on the fifth support structure 154. Then, the fastener(s) are inserted into respective ones of the secondary aperture(s) 1010 such that the fastener(s) extend at least partially through the fifth support structure 154, thereby coupling the first bracket 902 to the fifth support structure 154.

Figure 11:
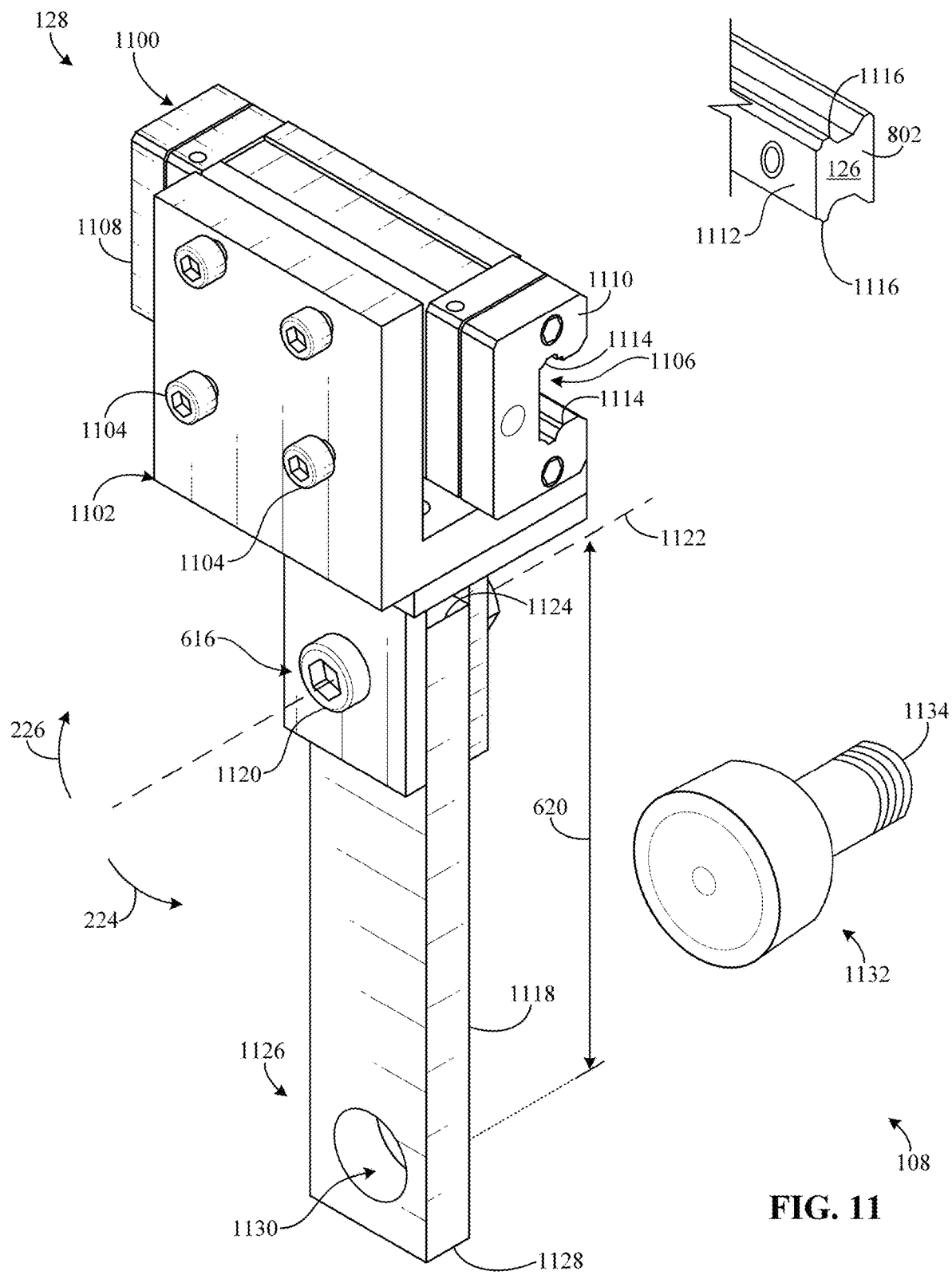
FIG. 11 is a partial view of an example receiver and shows and example adapter thereof in accordance with the teachings of this disclosure.

FIG. 11 is a partial view of the receiver 108 and shows the first example adapter 128 thereof. As shown in FIG. 11, the body 110 is removed from the receiver 108, and the first adapter 128 is separated from the first guide 126. According to the illustrated example of FIG. 11, the first adapter 128 includes a first example guide block 1100 and a second example bracket 1102 coupled to the first guide block 1100, for example, via one or more example fasteners and/or one or more example fastening methods or techniques. For example, as shown in FIG. 11, four example fasteners 1104 extend through a portion of the second bracket 1102 and at least partially through the first guide block 1100, thereby coupling the second bracket 1102 and the first guide block 1100 together.

The first guide block 1100 can be implemented, for example, using a linear guide block and/or a linear carriage configured to slidably couple to the first guide 126. In some examples, the first guide block 1100 includes a first example slot 1106 positioned thereon and extending across the first guide block 1100 from a first end 1108 of the first guide block 1100 to a second end 1110 of the first guide block 1100 opposite the first end 1108. In such example, the first guide 126 includes a first example rail 1112, as shown in FIG. 11. In particular, the slot 1106 of FIG. 11 is sized, shaped, structured, and/or otherwise configured to receive the first guide 126. Similarly, in some examples, the first rail 1112 of FIG. 11 is sized, shaped, structured, and/or otherwise configured to pass into the slot 1106. In particular, the first guide 126 of FIG. 11 is configured to the guide movement of the first guide block 1100 along at least a portion of the first guide 126 via the first rail 1112. In any case, the first rail 1112 of FIG. 11 extends along a linear or curved path from the first end 800 of the first guide 126 to the second end 802. Accordingly, in such examples, the first guide block 1100 is operatively coupled between the first rail 1112 and the body 110 of the receiver 108.

In some examples, to assemble the first adapter 128 and the first guide 126, the first guide block 1100 is first positioned and/or oriented such that the first slot 1106 is substantially aligned to the second end 802 of the first guide 126. Then, in such examples, the first guide block 1100 is positioned on the second end 802 whereby the second end 802 passes and/or is inserted into the first slot 1106.

In some examples, to facilitate sliding the first guide block 1100 along first guide 126, the first guide block 1100 of FIG. 1 includes one or more example bearings (e.g., one or more ball bearings) operatively interposed between (a) one or more example surfaces 1114 of first guide block 1100 at least partially forming and/or defining the first slot 1106 and (b) one or more example surfaces 1116 of the first rail 1112. In such examples, the bearing(s) slidably engage the surfaces 1114, 1116 when the first guide block 1100 moves relative to the first rail 1112, which substantially reduces frictional forces associated with such movement.

In some examples, to facilitate positioning the body 110 and/or allow for a reduced guide length, the first adapter 128 includes a fourth example arm 1118 movably coupled to the second bracket 1102 via the first one of the joint(s) 616. In some such examples, the first one of the joint(s) 616 includes a second example fastener (e.g., any one or more of a pin, a bolt, a stud, a nut, etc.) 1120 extending at least partially through a portion of the fourth arm 1118 and a portion of the second bracket 1102. In particular, the fourth arm 1118 is pivotable relative to the first one of the joint(s) 616 and/or a fourth example axis 1122 associated with the first one of the joints 616 in second direction 224 and/or the third direction 226. As shown in FIG. 11, the second fastener 1120 is positioned at or near a first end 1124 of the fourth arm 1118.

In some examples, to connect the body 110 and/or disconnect the body 110 from the fourth arm 1118, the first adapter 128 includes a first example coupling mechanism 1126 positioned on the fourth arm 1118 at or near a second end 1128 of the fourth arm 1118 opposite the first end 1124. In some examples, the first coupling mechanism 1126 includes a second example aperture (e.g., a bore or circular opening) 1130 extending at least partially through the fourth arm 1118. As shown in FIG. 11, the second aperture 1130 extends entirely through the fourth arm 1118. Further, as shown in FIG. 11, the fourth arm 1118 extends away from the first one of the joint(s) 616 toward the second aperture 1130 to define the fifth distance 620. In particular, in such examples, the second aperture 1130 is sized, shaped, structure, and/or otherwise configured to receive a portion of the receiver 108 to the support the portion of the receiver 108. For example, the body 110 is positioned in and/or inserted into the second aperture 1130 and coupled to the fourth arm 1118, for example, via one or more example fasteners and/or fastening methods or techniques (e.g., via any one or more of welding, adhesion, snap-fitting, etc.). In other words, the first guide block 1100 supports the fourth arm 1118, the body 110, and/or a different receiver portion (e.g., a cam follower) coupled to the fourth arm 1118. As such, in some examples, the first coupling mechanism 1126 includes one or more welds and/or one or more adhesives.

Additionally or alternatively, in some examples, the first adapter 128 includes a first example cam follower 1132 configured to couple (e.g., removably couple) to the fourth arm 1118 via the first coupling mechanism 1126. For example, an end 1134 of the first cam follower 1132 is positioned in and/or inserted into the second aperture 1130. In such examples, the cam follower 1132 is configured to engage a single adjustable object attachment such as, for example, the first or second attachment 202, 204. However, in examples where the receiver 108 includes the body 110, the body 110 is configured to engage each of the object attachments 202, 204, which prevents the pallet 201 from rotating during the object adjustment operation 300 during certain manufacturing conditions. In some examples, one or more (e.g., all) of the body 110, the first cam follower 1132, a second cam follower (e.g., similar to the first cam follower 1132) associated with the second adapter 134, the fourth arm 1118, and a fifth example arm (e.g., similarly to the fourth arm 1118) associated with the second adapter 134 are sometimes referred to as a raising mechanism assembly.

FIG. 12A is another view of the first adapter 128 of FIG. 11. According to the illustrated example of FIG. 12A, the second bracket 1102 includes a first portion (e.g., an L-shaped portion) 1200 and second portion (e.g., a T-shaped portion) 1202 coupled to the first portion 1200, for example, via one or more example fasteners 1204 extending at least partially through the first and second portions 1200, 1202. In some example, the second portion 1202 of FIG. 12A includes one or more examples plates 1206, 1208 extending away from the first portion 1200 to receive the fourth arm 1118, two of which are shown in this example (i.e., a first plate 1206 and a second plate 1208). As shown in FIG. 12A, the fourth arm 1118 is interposed between the first and second plates 1206, 1208 and/or is otherwise at least partially positioned in an example space 1210 that is between the first and second plates 1206, 1208. In such examples, the fourth arm 1118 is fitted between the two plates 1206, 1208 such that the fourth arm 1118 is pivotable relative to opposing surfaces of the plates 1206, 1208.

As shown in FIG. 12A, the second fastener 1120 extends entirely through the first plate 1206, the fourth arm 1118, and the second plate 1208. Additionally, the second fastener 1120 of FIG. 12A includes an example washer 1212 and an example nut 1214 that is threadably coupled thereto and urging the washer 1212 into the second plate 1208. Although FIG. 12A depicts the two plates 1206, 1208, in some examples, the second portion 1202 is sized, shaped, structured, and/or configured differently. In some such examples, the second portion 1202 includes a single plate 1206, 1208.

As shown in FIG. 12A, the body 110 is positioned on the fourth arm 1118. In such examples, the body 110 extends from the fourth arm 1118 to a fifth arm movably coupled to the second adapter 134. In such examples, the body 110 maintains a connection between the first and second adapters 128, 134 to enable simultaneously movement of the first and second adapters 128, 134 relative to the respective first and second guides 126, 132.

FIG. 12B is a partial cross-sectional view of the first adapter 128 along line B-B of FIG. 12A. According to the illustrated example of FIG. 12B, the second fastener 1120 extends through a third example aperture (e.g., a bore or circular opening) 1216 positioned on the fourth arm 1118. Additionally or alternatively, in some examples, the first adapter 128 includes an example bearing (e.g., a cylindrically shaped bearing, for example, constructed of brass) 1218 positioned in the third aperture 1216 and operatively coupled to the fourth arm 1118 and/or the second fastener 1120, which improves performance and/or a capacity of the first one of the joint(s) 616. In particular, in such examples, an outer surface (e.g., an outer circumferential surface) of the bearing 1218 is configured to slidably engage an inner surface (e.g., an inner circumferential surface) of the fourth arm 1118 arm forming and/or defining the third aperture 1216. As shown in FIG. 12B, the second fastener 1120 is centrally disposed in the bearing 1218 and/or otherwise extends at least partially through the bearing 1218. Further, in some such examples, an inner surface (e.g., an inner circumferential surface) of the bearing 1218 is configured to slidably engage an outer surface (e.g., an outer circumferential surface) of the second fastener 1120. As such, the first one of the joint(s) 616 is formed and/or defined by (a) the second bracket 1102, (b) the fourth arm 1118, the bearing 1218, and/or (c) the second fastener 1120. However, in some examples, the first one of the joint(s) 616 is structured and/or configured differently while still enabling the fourth arm 1118 to pivot relative thereto.

Although FIGS. 11, 12A, and 12B depict aspects in connection with a single adapter 128, in some examples, such aspects likewise apply to one or more other adapters associated with the receiver 108 such as, for example, the second adapter 134.

As used herein, the terms "including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended. Further, when used in connection with multiple elements, the term "and/or" refers to any combination, permutation, or subset of the elements.

Figure 13:
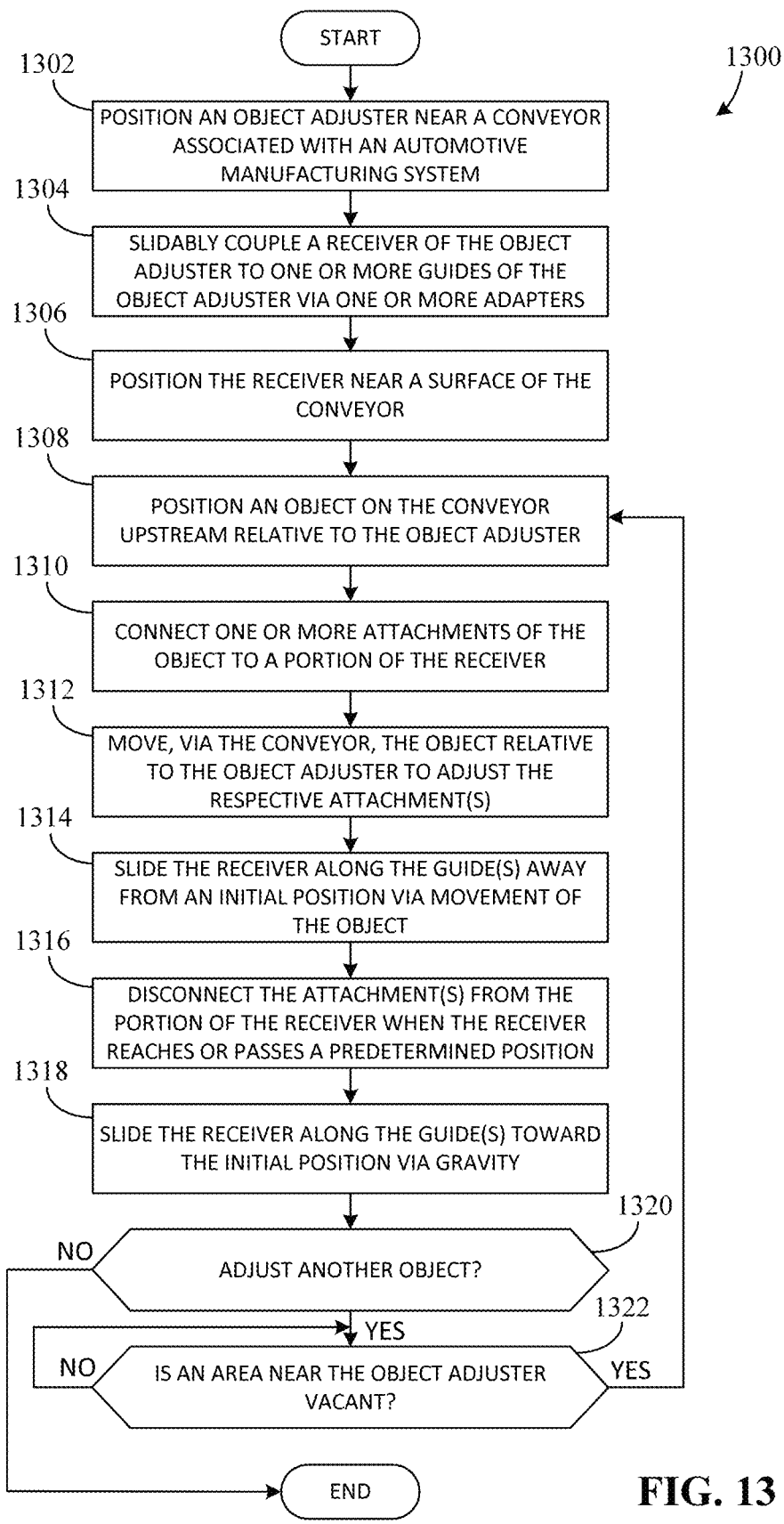
FIG. 13 is a flowchart representative of an example method that may be executed to adjust one or more objects of interest associated with an automotive manufacturing system.

FIG. 13 is a flowchart representative of an example method 1300 that may be executed to adjust one or more objects of interest (e.g., the pallet 201 and/or one or more other pallets) associated with an automotive manufacturing system. The example method 1300 of FIG. 13 can be implemented in the example automotive manufacturing system 100 of FIG. 1.

The example method 1300 of FIG. 13 begins by positioning an object adjuster near a conveyor associated with an automotive manufacturing system (block 1302). In some examples, the object adjuster 102 of FIG. 1 is positioned near the conveyor 104, which are associated with the automotive manufacturing system 100.

The example method 1300 of FIG. 13 also includes slidably coupling a receiver of the object adjuster to one or more guides of the object adjuster via one or more adapters (block 1304). In some examples, the receiver 108 of FIG. 1 is slidably coupled to the first guide 126 via the first adapter 128 and/or the second guide 132 via the second adapter 134. For example, as previously mentioned, the first guide block 1100 of the first adapter 128 is positioned on the second end 802 of the first guide 126 such that the first rail 1112 enters the first example slot 1106.

The example method 1300 of FIG. 13 also includes positioning the receiver near a surface of the conveyor (block 1306). In some examples, the receiver 108 of FIG. 1 is positioned near (i.e., adjacent) the first surface 112 of the conveyor 104, for example, at the first end 800 of the first guide 126 and/or a first end of the second guide 132 such that the receiver 108 is in the first position thereof (e.g., see FIGS. 1, 3, 7, and 8).

The example method 1300 of FIG. 13 also includes positioning an object on the conveyor upstream relative to the object adjuster (block 1308). In some examples, a user and/or the controller 166 of FIG. 1 positions the pallet 201 on the conveyor 104 upstream relative to the conveyor 104 (e.g., see FIG. 3). For example, the controller 166 controls, via the conveyor actuator(s) 106, a different conveyor and/or a machine connected to the conveyor 104 of FIG. 1 to transfer the pallet 201 to the conveyor 104.

The example method 1300 of FIG. 13 also includes connecting one or more attachments of the object to a portion of the receiver (block 1310). In some examples, the controller 166 of FIG. 1 connects the first attachment 202 to the body 110 of the receiver 108 and/or the second attachment 204 to the body 110 (e.g., see FIG. 3). For example, the controller 166 directs the conveyor actuator(s) 106 to urge the pallet 201 in the first direction 124 toward the receiver 108 and/or the area of interest 506. Additionally, in some such examples, the controller 166 causes the first and second attachments 202, 204 to simultaneously connect to the body 110.

The example method 1300 of FIG. 13 also includes moving, via the conveyor, the object relative to the object adjuster to adjust the respective attachment(s) (block 1312). In some examples, the controller 166 of FIG. 1 moves, via the conveyor, the pallet 201 relative to the object adjuster 102 to adjust the first attachment 202 and/or the second attachment 204 based on movement of pallet 201 relative to the object adjuster 102. In other words, the controller 166 initiates the object adjustment operation 300. For example, the controller 166 directs the conveyor actuator(s) 106 to urge the pallet 201 across the second distance 402 and/or at least partially through the area of interest 506. As the pallet 201 travels across the second distance 402, the first attachment 202 moves from the first position thereof to the second position thereof, which provides the adjusted state of the first attachment 202. Similarly, in some examples, as the pallet 201 travels across the second distance 402, the second attachment 204 moves from the first position thereof to the second position thereof, which provides the adjusted state of the second attachment 204. Further, in such examples, the first and second attachments 202, 204 move simultaneously and/or otherwise are adjusted during the same time interval (e.g., a time interval during which the pallet 201 is traveling across the second distance 402) associated with the object adjustment operation 300.

The example method 1300 of FIG. 13 also includes sliding the receiver along the guide(s) away from an initial position via movement of the object (block 1314). In some examples, the receiver 108 of FIG. 1 slides along the first guide 126 and/or the second guide 132 in the fourth direction 404 defined by the guide(s) 126, 132 away from the first position of the receiver 108 via movement of the pallet 201 (e.g., see FIG. 4), for example, in response to the attachment(s) 202, 204 imparting the first load 122 on the body 110. That is, in such examples, a kinetic energy and/or an inertia associated with the pallet 201 provided during such pallet movement drives the receiver 108 and/or otherwise causes the receiver 108 to slide up the guide(s) 126, 132 at least partially in the vertical direction 410.

The example method 1300 of FIG. 13 also includes disconnecting the attachment(s) from the portion of the receiver when the receiver reaches or passes a predetermined position (block 1316). In some examples, the first attachment 202 and/or the second attachment 204 disconnects from the body 110 when the receiver 108 reaches or passes the second position thereof (e.g., see FIG. 5), for example, via the kinetic energy and/or the inertia associated with the pallet 201.

The example method 1300 of FIG. 13 also includes sliding the receiver along the guide(s) toward the initial position via gravity (block 1318). In some examples, the receiver 108 of FIG. 1 slides along the first guide 126 and/or the second guide 132 in the fifth direction 504 defined by the guide(s) 126, 132 toward the first position of the receiver 108 (e.g., see FIG. 5) via gravity, for example, in response to the third load 502 being imparted on the receiver 108. That is, in such examples, the weight of the receiver 108 drives the receiver 108 and/or otherwise causes the receiver 108 to slide down the guide(s) 126, 132. In this manner, the object adjuster 102 resets using gravity and/or without any other power or energy sources.

The example method 1300 of FIG. 13 also includes determining whether to adjust another object (block 1320). In some examples, a user and/or the controller 166 of FIG. 1 determine whether to adjust another pallet. In some examples, if the user and/or the controller 166 provide a positive determination (e.g., the production run associated with the automotive manufacturing system 100 is not complete) (block: 1320: YES), control of the example method 1300 proceeds to block 1322. In this manner, the object adjuster 102 adjusts multiple pallets (e.g., any number of pallets associated with production demand such as between about 400 pallets and about 800 pallets) and/or the adjustment operation 300 occurs multiple times (e.g., between about 400 occurrences and about 800 occurrences) during an example time interval (e.g., about 8 hours) associated with the production run. In some such examples, the operations of the blocks 1310, 1312, 1314, 1316, 1318 occur during an example time interval or cycle time that is associated with production demand and/or otherwise predetermined. For example, the cycle time corresponding to these operations is about 15 seconds or less but may increase depending on a speed of the conveyor 104 and/or an associated production line. On the other hand, in some examples, if the user and/or the controller 166 provide a negative determination (e.g., the production run associated with the automotive manufacturing system 100 is not complete) (block 1320: NO), the example process ends.

The example method 1300 of FIG. 13 also includes determining whether an area near the object adjuster is vacant (block 1322). In some examples, the controller 166 of FIG. 1 determines whether the area of the interest 506 is vacant. For example, as previously mentioned, the controller 166 detects the location of the pallet 201 via the sensor(s) 508. In such examples, if the controller 166 provides a positive determination (e.g., the pallet 201 is not positioned in the area of the interest 506) (block 1322: YES), control of the example method returns to block 1308. On the other hand, in some examples, if the controller 166 provides a negative determination (e.g., the pallet 201 is at least partially positioned in the area of the interest 506) (block 1322: NO), the controller 166 waits for a time interval (e.g., a predetermined time interval programed into the controller 166) and/or control of the example method 1300 returns to block 1322. In such examples, the controller 166 monitors the area of interest 506 via the sensor(s) 508.

Although the example method 1300 is described in connection with the flowchart of FIG. 13, other methods of implementing the automotive manufacturing system 100 may alternatively be used. For example, the order of execution of the blocks 1302, 1304, 1306, 1308, 1310, 1312, 1314, 1316, 1318, 1320, 1322 may be changed, and/or some of the blocks 1302, 1304, 1306, 1308, 1310, 1312, 1314, 1316, 1318, 1320, 1322 described may be changed, eliminated, or combined.

It will be appreciated that the systems, apparatus, and methods disclosed in the foregoing description provide numerous advantages. Examples disclosed herein provide an example object adjuster configured to adjust one or more movable attachments of an object when the object moves along a conveyor via movement of the movable object relative to an example object adjuster, which reduces plant downtime and/or operation costs typically associated with adjusting such objects. Some disclosed examples reset a receiver of the object adjuster via a weight of the receiver, which improves plant safety by eliminating hazardous components typically associated with vehicle manufacturing systems.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An object adjuster for an automotive manufacturing system, comprising: a frame; a guide having a first guide and a second guide that are supported by the frame and positioned adjacent a conveyor configured to convey an object; and a receiver slidably coupled to the first guide and second guide so that the receiver connects the first guide to the second guide, the receiver including a portion configured to engage an attachment movably coupled to the object to adjust the attachment when the object moves.

2. The object adjuster of claim 1, wherein the receiver is configured to slide along the guide at least partially in a vertical direction away from an initial position of the receiver in response to the attachment imparting a force on the portion of the receiver.

3. The object adjuster of claim 2, wherein the portion of the receiver is configured to disengage from the attachment after the attachment moves relative to the object from a first position to a second position.

4. The object adjuster of claim 3, wherein the receiver is configured to slide down the guide in response to a gravitational force imparted on the receiver.

5. The object adjuster of claim 4, further including a stopper coupled to the frame and positioned adjacent an end of the guide, the stopper configured to engage a portion of the receiver to decelerate or limit movement of the receiver.

6. The object adjuster of claim 1, wherein the guide includes a rail that extends along a linear or curved path from a first end of the guide to a second end of the guide opposite the first end.

7. The object adjuster of claim 6, wherein the rail and a horizontal axis form an angle that is between 15 degrees and 45 degrees.

8. The object adjuster of claim 6, wherein the receiver includes a guide block operatively coupled between the rail and the portion the receiver.

9. The object adjuster of claim 8, wherein the receiver includes an arm movably coupled to the guide block via a joint formed by the arm and a bracket coupled to the guide block, the portion of the receiver positioned on the arm and spaced from the joint.

10. The object adjuster of claim 8, wherein the portion of the receiver includes a bar supported by the guide block.

11. The object adjuster of claim 1, wherein the attachment includes an arm and a receptacle positioned on the arm, and wherein the portion of the receiver passes into a recessed area formed by the receptacle.

12. The object adjuster of claim 1, wherein the attachment is a first attachment, and wherein the portion of the receiver is configured to engage a second attachment movably coupled to the object to simultaneously adjust the first and second attachments when the object moves.

13. The object adjuster of claim 1, wherein the first guide is positioned adjacent a first side of the conveyor and the second guide is positioned adjacent a second side of the conveyor opposite the first side.

14. The object adjuster of claim 1, wherein the first guide is spaced by a first distance from a central axis of the conveyor and the second guide is spaced by a second distance from the central axis different than or substantially the same relative to the first distance.

15. An automotive manufacturing system, comprising:
a conveyor configured to receive an object; and
an object adjuster positioned adjacent the conveyor and including a first portion and a second portion slidable along the first portion, the first portion configured to guide movement of the second portion relative to a conveyor surface, the second portion and an adjustable portion of the object configured to move each other when the conveyor conveys the object,
wherein the second portion is configured to slide along the first portion at least partially in a vertical direction away from an initial position of the second portion in response to the adjustable portion imparting a force on the second portion and a part of the second portion is configured to disengage from the adjustable portion after the adjustable portion moves relative to the object from a first position to a second position.

16. A method for adjusting an object associated with an automotive manufacturing system, comprising:
positioning a receiver of an object adjuster adjacent a conveyor that is configured to move the object, the receiver slidable along a guide of the object adjuster;
moving, via the conveyor, the object such that an attachment movably coupled to the object engages a portion of the receiver to adjust the attachment based on movement of the object; and
sliding, via gravity, the receiver along the guide in a second direction, opposite the first direction, defined by the guide toward the initial position of the receiver.

17. The method of claim 16, further including sliding, via movement of the object, the receiver along the guide in a first direction defined by the guide away from a first position of the receiver.

18. The method of claim 17, further including disconnecting the attachment from the portion of the receiver when the receiver reaches or passes a second position of the receiver different relative to the first position.

* * * * *